United States Patent
Kobayashi

(10) Patent No.: US 11,400,818 B2
(45) Date of Patent: Aug. 2, 2022

(54) DRIVE CONTROL APPARATUS FOR CONTROLLING VEHICLE DRIVE SYSTEM

(71) Applicant: DENSO CORPORATION, Kariya (JP)

(72) Inventor: Hisaaki Kobayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 503 days.

(21) Appl. No.: 16/439,958

(22) Filed: Jun. 13, 2019

(65) Prior Publication Data

US 2019/0381898 A1   Dec. 19, 2019

(30) Foreign Application Priority Data

Jun. 15, 2018   (JP) .............................. JP2018-114938

(51) Int. Cl.
| | |
|---|---|
| *B60L 50/61* | (2019.01) |
| *B60L 1/00* | (2006.01) |
| *B60L 53/24* | (2019.01) |
| *B60L 58/12* | (2019.01) |
| *B60K 6/28* | (2007.10) |
| *B60L 58/26* | (2019.01) |

(52) U.S. Cl.
CPC ................ *B60L 50/61* (2019.02); *B60K 6/28* (2013.01); *B60L 1/00* (2013.01); *B60L 53/24* (2019.02); *B60L 58/12* (2019.02); *B60L 58/26* (2019.02); *B60L 2210/10* (2013.01); *B60L 2240/545* (2013.01); *B60Y 2400/112* (2013.01); *B60Y 2400/89* (2013.01)

(58) Field of Classification Search
CPC .. B60L 50/61; B60L 1/00; B60L 53/24; B60L 58/12; B60L 58/26; B60L 2210/10; B60L 2240/545; B60L 2240/34; B60L 1/02; B60L 7/10; B60L 58/27; B60L 58/20; B60L 50/60; B60K 6/28; B60Y 2400/112; B60Y 2400/89; Y02T 10/62; Y02T 10/70; Y02T 10/7072; Y02T 90/14

USPC ......................................................... 320/123
See application file for complete search history.

(56) References Cited

U.S. PATENT DOCUMENTS

| | | | |
|---|---|---|---|
| 2014/0070606 A1* | 3/2014 | Gibeau ................... | B60L 58/15 307/9.1 |
| 2018/0319243 A1* | 11/2018 | Blatchley ............ | H01M 10/613 |

FOREIGN PATENT DOCUMENTS

| | | |
|---|---|---|
| JP | 2001-169404 A | 6/2001 |
| JP | 2002-203583 A | 7/2002 |
| JP | 2013-119355 A | 6/2013 |
| JP | 2016-084121 A | 5/2016 |
| JP | 2017-147121 A | 8/2017 |

* cited by examiner

*Primary Examiner* — Paul Dinh
(74) *Attorney, Agent, or Firm* — Oliff PLC

(57) ABSTRACT

A drive control apparatus is provided for controlling a drive system mounted in a vehicle, where the drive system includes a power generator, at least one rechargeable battery, accessories powered by electrical power supplied from either or both of the least one rechargeable battery and the power generator. In the drive control apparatus, a selector is configured to, during power generation by the power generator, select the power generator as a power source for the accessories in preference to the least one rechargeable battery. A power controller is configured to, if generated power by the power generator exceeds power consumption of the accessories, increase the power consumption of the accessories.

9 Claims, 12 Drawing Sheets

FIG.3

| POWER DEMAND OF CONVERTER | AIR CONDITIONING | INTERNAL CABIN TEMPERATURE | POWER DISTRIBUTION |
|---|---|---|---|
| PREFERRED | (NO REGARD) | (NO REGARD) | INCREASE POWER CONSUMPTION OF CONVERTER |
| NON-PREFERRED | OFF | (NO REGARD) | INCREASE POWER CONSUMPTION OF CONVERTER |
| | HEATING | LOW | INCREASE POWER CONSUMPTION OF COMPRESSOR |
| | | WITHIN TARGET TEMPERATURE RANGE | |
| | | HIGH | INCREASE POWER CONSUMPTION OF CONVERTER |
| | COOLING | HIGH | INCREASE POWER CONSUMPTION OF COMPRESSOR |
| | | WITHIN TARGET TEMPERATURE RANGE | |
| | | LOW | INCREASE POWER CONSUMPTION OF CONVERTER |
| INHIBITED | OFF | (NO REGARD) | WITHHOLD INCREASING POWER CONSUMPTION |
| | HEATING | LOW | INCREASE POWER CONSUMPTION OF COMPRESSOR |
| | | WITHIN TARGET TEMPERATURE RANGE | |
| | | HIGH | WITHHOLD INCREASING POWER CONSUMPTION |
| | COOLING | HIGH | INCREASE POWER CONSUMPTION OF COMPRESSOR |
| | | WITHIN TARGET TEMPERATURE RANGE | |
| | | LOW | WITHHOLD INCREASING POWER CONSUMPTION |

FIG.4

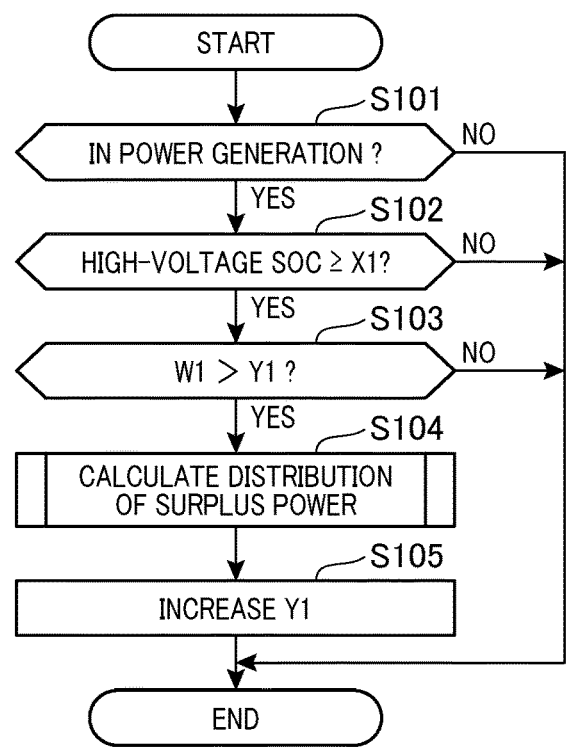

FIG.12A
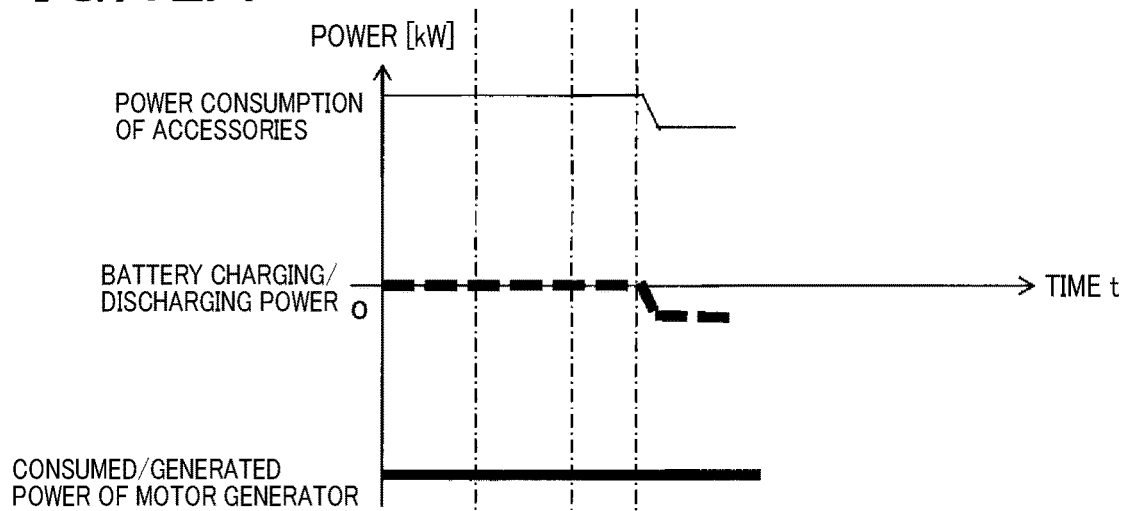
FIG.12B
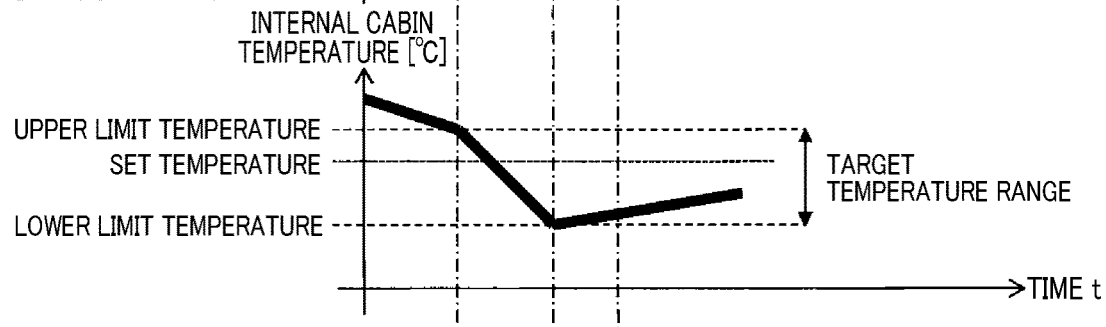
FIG.12C
FIG.12D
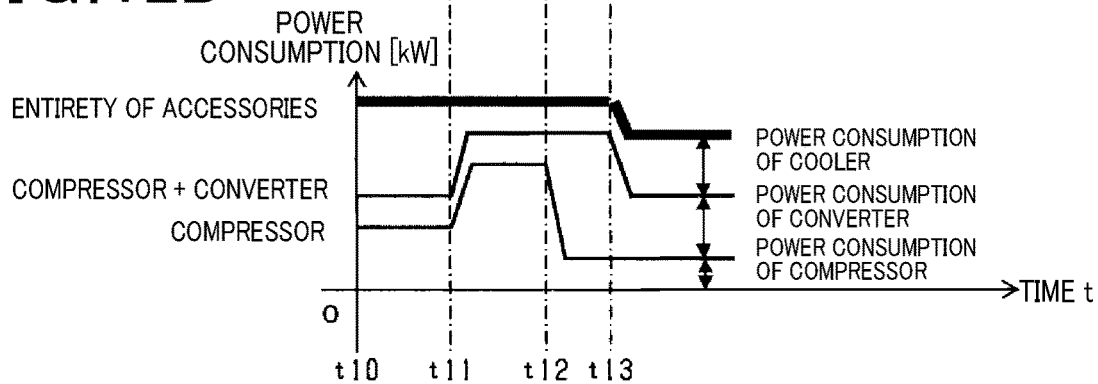

DRIVE CONTROL APPARATUS FOR CONTROLLING VEHICLE DRIVE SYSTEM

CROSS-REFERENCE TO RELATED APPLICATION

This application is based on and claims the benefit of priority from earlier Japanese Patent Application No. 2018-114938 filed on Jun. 15, 2018, the description of which is incorporated herein by reference.

BACKGROUND

Technical Field

This disclosure relates to a drive control apparatus for controlling a vehicle drive system including a motor generator.

Related Art

A vehicle drive system is known that includes a rechargeable battery and a power generator and can use electrical power supplied from the rechargeable battery and electrical power generated by the power generator. In this drive system, the electrical power generated by the power generator can be charged in the rechargeable battery and then used as needed. However, power loss takes place in the rechargeable battery during charging and discharging of the rechargeable battery. Preventing unnecessary charging and discharging of the rechargeable battery can reduce wasteful power consumption. In order to reduce power loss that takes place in the rechargeable battery during charging and discharging of the rechargeable battery, a technique is known such that accessories are powered by power supplied from the motor generator during regenerative braking. When power consumption of the accessories can not be covered by power supplied from the motor generator, the deficit is supplied from the rechargeable battery.

BRIEF DESCRIPTION OF THE DRAWINGS

In the accompanying drawings:

FIG. 3 is an example power distribution table stored in the drive control apparatus;

FIG. 4 is a flowchart of drive control processing according to a first embodiment;

FIGS. 12A-12D are a timing diagram of power distribution according to the fourth embodiment;

DESCRIPTION OF SPECIFIC EMBODIMENTS

Figure 1:
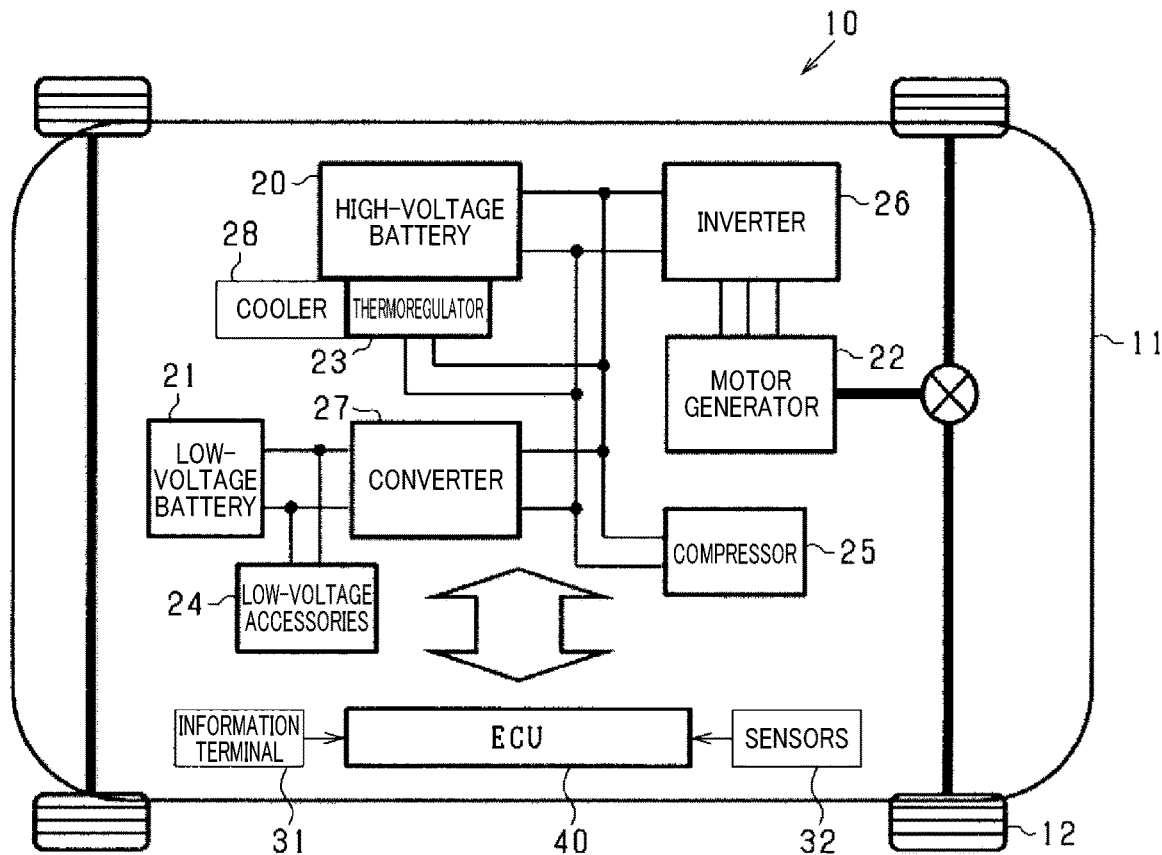
FIG. 1 is a schematic diagram of a drive system.

In the known technique, as disclosed in JP-A-2001-169404, when the generated power by the motor generator exceeds the power consumption of the accessories, surplus power is charged in the rechargeable battery. For example, there may be cases where the generated power by the motor generator varies while a power demand of the accessories is steady. In such cases, more generated power by the motor generator is charged in the rechargeable battery and thereafter supplied to the accessories from the rechargeable battery, which may lead to increased charge/discharge loss of the rechargeable battery.

In view of the above, it is desired to have a drive control apparatus for a vehicle drive system, that can achieve vehicle drive control with more reduced charging and discharging loss of the rechargeable battery.

Hereinafter, exemplary embodiments of the present disclosure will be described in detail with reference to the accompanying drawings, in which like reference numerals refer to like or similar elements regardless of reference numerals and duplicated description thereof will be omitted.

First Embodiment

FIG. 1 illustrates a vehicle drive system 10 according to a first embodiment. The drive system 10 is mounted in a vehicle 11 that is an electric vehicle (EV). The drive system 10 can drive wheels 12 to drive the vehicle 11. The drive system 10 includes a high-voltage battery 20, a low-voltage battery 21, a motor generator (MG) 22, a thermoregulator 23, low-voltage accessories 24, a compressor 25, an inverter 26, a converter 27, and an electronic control unit (ECU) 40. The vehicle 11 includes an information terminal 31 and sensors 30. The drive system 10 includes, as accessories, the thermoregulator 23, the low-voltage accessories 24, the compressor 25, the inverter 26, the converter 27, and the cooler 28.

The high-voltage battery 20 and the low-voltage battery 21 are secondary batteries. More specifically, for example, the high-voltage battery 20 is a lithium-ion battery, but is not limited thereto. The low-voltage battery 21 is a lead-acid battery, but is not limited thereto. The high-voltage battery 20 has a relatively high output voltage of the order of 200 to 300 volts. The low-voltage battery 21 has a relatively low output voltage of the order of 20 to 30 volts.

The motor generator 22 converts rotational energy of the wheels 12 into electrical power when operating as a generator. The motor generator 22 converts electrical power supplied from the high-voltage battery 20 into rotational energy when operating as an electric motor.

The thermoregulator 23 is configured to warm the high-voltage battery 20 when energized. The cooler 28 is configured to cool the high-voltage battery 20 when energized. The cooler 28 may be formed of a cooling fan or the like. Energization of each of the thermoregulator 23 and the cooler 28 is controlled based on the temperature of the high-voltage battery 20, such that the thermoregulator 23 heats the high-voltage battery 20 as appropriate and the cooler 28 cools the high-voltage battery 20 as appropriate.

The thermoregulator 23 and the cooler 28 are powered by power supplied from the high-voltage battery 20 or power generated by the motor generator 22.

The low-voltage accessories 24 are powered by power generated by the motor generator 22 or relatively low-voltage power supplied from the high-voltage battery 20, the low-voltage battery 21 or the converter 27. The accessories 24 are comprised of devices whose operating voltage is of the order of several dozen volts.

The compressor 25 is an electric air conditioning compressor that forms an air conditioning system for cooling or heating within the cabin of the vehicle. The compressor 25 is powered by power generated by the motor generator 22 or a voltage of the order of several hundred volts supplied from the high-voltage battery 20.

The inverter 26 is connected between the high-voltage battery 20 and the motor generator 22. The inverter 26 converts alternating-current (AC) power into direct-current (DC) power when the motor generator 22 operates as a power generator, which enables charging the high-voltage battery 20. The inverter 26 converts direct-current (DC) power output from the high-voltage battery 20 into alternating-current (AC) power, which enables actuating the motor generator 22.

The converter 27 is a DC-to-DC converter. The converter 27 is connected between the high-voltage battery 20 and inverter 26 and the low-voltage battery 21. The converter 27 is connected between a high side (the high-voltage battery 20 and inverter 26 side) and a low side (the low-voltage battery 21 side). The converter 27 steps down voltages input from the high side and outputs the stepped-down voltages to the low side. The converter 27 steps up voltages input from the low side and outputs the stepped-up voltages to the high side.

The information terminal 31 acquires information input from outside of the vehicle 11 and driving assistance devices and outputs the information to the ECU 40. The sensors 32 are conventionally well-known sensors configured to detect an environmental or operational state of the vehicle 11. More specifically, the sensors 32 may include a torque sensor, an external temperature sensor, an internal cabin temperature sensor. Detected information from the sensors 32 is input to the ECU 40.

Figure 2:
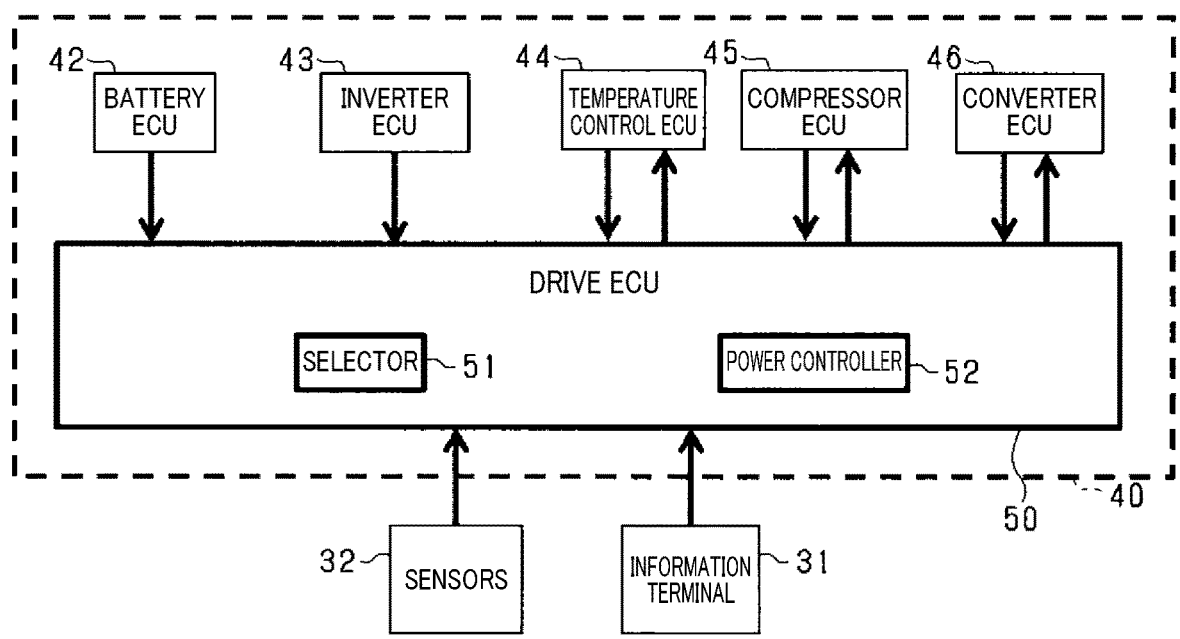
FIG. 2 is a schematic diagram of a drive control apparatus.

The ECU 40 is a drive control apparatus for controlling various elements of the drive system 10, such as the high-voltage battery 20, the motor generator 22, and the accessories. As shown in FIG. 2, the ECU 40 includes a drive ECU 50 that performs drive control of the vehicle 11, a battery ECU 42 that controls the high-voltage battery 20 and the low-voltage battery 21, an inverter ECU 43 that controls the inverter 26, a temperature control ECU 44 that controls the thermoregulator 23, a compressor ECU 45 that controls the compressor 25, and a converter ECU 46 that controls the converter 27. Each ECU 42-46, 50 is configured as a microcomputer including a central processing unit (CPU), a read-only memory (ROM), a random-access memory (RAM), a backup RAM, an input-output interface, and other components (all not shown). Functions of each ECU described later may be implemented by the CPU loading and executing computer programs stored in the ROM that serves as a non-transitory computer readable storage medium in the present embodiment.

The drive ECU 50 is configured to acquire information from the information terminal 31 and the sensors 32. The drive ECU 50 also acquires information regarding various devices from the battery ECU 42, the inverter ECU 43, the temperature control ECU 44, the compressor ECU 45, the converter ECU 46 and outputs a command signal to each of the ECUs 42-46, thereby controlling the batteries 20, 21 and the accessories. The drive ECU 50 can perform control processing to control charging and discharging power of the rechargeable batteries (i.e., the high-voltage battery 20 and the low-voltage battery 21) and power consumption of the accessories (i.e., the thermoregulator 23, the low-voltage accessories 24, the compressor 25, the inverter 26, the converter 27, and the cooler 28). The drive ECU 50 controls the motor generator 22 to control the power running operation and the regenerative operation of the motor generator 22.

The drive ECU 50 includes a selector 51 and a power controller 52. The selector 51 selects at least one power source that supplies power to the accessories including the thermoregulator 23, the low-voltage accessories 24, the compressor 25, the inverter 26, and the converter 27. The selector 51 selects the at least one power source that supplies power to the accessories, from the high-voltage battery 20, the low-voltage battery 21, and the motor generator 22 mounted in the vehicle 11 as power sources. When two or more power sources are selected, the selector 51 may set a ratio of power supplied from each selected power source to power consumption of the accessories. More specifically, the selector 51 may be configured to set a ratio or power supplied from each selected power source to total power consumption of the accessories or may be configured to set, for each accessory, a ratio of power supplied from each power source to the accessary.

During power generation by the motor generator 22, the selector 51 selects the motor generator 22 in preference to the high-voltage battery 20 and the low-voltage battery 21, as a power source that supplies power to these accessories. More specifically, for example, the selector 51 may be configured to, during power generation by the motor generator 22, select the motor generator 22 as a power source that supplies power to these accessories, and if power consumption of the accessories exceeds generated power by the motor generator 22, cause the high-voltage battery 20 or the low-voltage battery 21 to supply the deficit.

The power controller 52 is configured to, if generated power by the motor generator 22 exceeds total power consumption of the accessories, increase the power consumption of the accessories. More specifically, the power controller 52 calculates surplus power that is a difference between current generated power by the motor generator 22 and total power consumption of the accessories and increases the total power consumption of the accessories so as to minimize the surplus power. That is, the phrase "increase power consumption of the accessories" as used herein is intended to increase power consumption of the accessories as compared to power consumption of the accessories when there is no surplus power.

Preferably, the power consumption of the accessories may be increased such that an increased amount of power consumption of the accessories can be covered by the surplus power. The power controller 52 may be configured to increase the power consumption of the accessories to consume all of the surplus power or may be configured to increase the power consumption of the accessories to consume part of the surplus power and use the rest of the surplus power to charge the batteries 20, 21. The power controller 52 may be configured to select some of the accessories to increase the power consumption of the selected accessories or may be configured to increase the power consumption of all of the accessories. The power controller 52 may be configured to, based on information from various devices included in the vehicle, select accessories whose power consumption is to be increased or may be configured to, based on a prescribed condition, determine a priority level for each accessory whose power consumption is to be increased.

Meanwhile, the power controller 52 may be configured to, even if generated power by the motor generator 22 exceeds the total power consumption of the accessories, inhibit an increase of the power consumption of the accessories under a prescribed condition. For example, the power controller 52 may be configured to, if a state of charge (SOC) of the rechargeable battery for a certain one of the accessories is equal to or less than a predetermined SOC threshold, inhibit an increase of the power consumption of the accessory. This SOC threshold may be set for a respective one of the rechargeable batteries for the accessories. For example, the SOC threshold may be set to a specific value that can prevent over-discharge of the rechargeable battery. The phrase "inhibit an increase of the power consumption" may be intended to reduce an increase of the power consumption or withhold increasing the power consumption.

The power controller 52 may be configured to, if a temperature of the high-voltage battery 20 or the low-voltage battery 21 is within a prescribed battery temperature range, increase the power consumption of the accessories, and if the temperature of the high-voltage battery 20 or the low-voltage battery 21 is out of the prescribed battery temperature range, inhibit an increase of the power consumption of the accessories. This battery temperature range may be set for a respective one of the rechargeable batteries. For example, the battery temperature range for a respective one of the rechargeable batteries may be set in a temperature range that can ensure battery performance and lifetime of the rechargeable battery.

The drive system 10 includes, as an accessory, a temperature controller, such as the thermoregulator 23 or the cooler 28, that can control a temperature of the high-voltage battery 20 or the low-voltage battery 21. In such an embodiment, the power controller 52 is configured to, if a temperature of the high-voltage battery 20 or the low-voltage battery 21 is out of a predetermined temperature range, increase power consumption of the temperature controller for the high-voltage battery 20 or the low-voltage battery 21 in preference to power consumption of the accessories other than the temperature controller. For example, the power controller 52 may be configured to, providing that the temperature of the high-voltage battery 20 is equal to or less than a predetermined heating threshold, increase power consumption of the thermoregulator 23 in preference to power consumption of the accessories other than the thermoregulator. In addition, the power controller 52 may be configured to, providing that the temperature of the high-voltage battery 20 is equal to or greater than a predetermined cooling threshold, increase power consumption of the cooler 28 in preference to power consumption of the accessories other than the cooler 28. Each of the heating threshold and the cooling threshold may be set in a temperature range that can ensure battery performance and lifetime of the rechargeable battery.

The drive system 10 includes, as an accessory, the compressor 25 used for air conditioning within the cabin of the vehicle 11. The power controller 52 may be configured to, if an internal cabin temperature is out of a predetermined forbidden temperature range that is set for a set temperature for air conditioning and an outside temperature, increase power consumption of the compressor 25 in preference to power consumption of the accessories other than the compressor 25. Preferably, in cooling, the forbidden temperature range may be defined as a temperature range of temperatures lower than the set temperature. Preferably, in heating, the forbidden temperature range may be defined as a temperature range of temperatures higher than the set temperature. The power controller 52 may be configured to, when the internal cabin temperature is within the predetermined forbidden temperature range, withhold increasing the power consumption of the compressor 25.

The ECU 40 is configured to set a target temperature range defined by a lower limit temperature below a temperature set by a driver's input or the like and an upper-limit temperature above the set temperature. In normal operation where there is no need to consume surplus power of the motor generator 22, the power controller 52 feedback controls the compressor 15 to keep the internal cabin temperature within the target temperature range. The power controller 52 may be configured to, when consuming surplus power of the motor generator 22, increase the power consumption of the compressor 25 even if the internal cabin temperature is within the target temperature range. More specifically, the power controller 52 may be configured to, in heating, increase the power consumption of the compressor 25 until the internal cabin temperature exceeds the set temperature and reaches the upper-limit temperature of the target temperature range. The power controller 52 may be configured to, in cooling, increase the power consumption of the compressor 25 until the internal cabin temperature falls below the set temperature and reaches the lower-limit temperature of the target temperature range. The upper-limit temperature of the target temperature range or the lower-limit temperature of the target temperature range may be used as a threshold of the forbidden temperature range. More specifically, in cooling, the forbidden temperature range may be set to a temperature range below the lower-limit temperature of the target temperature range. In heating, the forbidden temperature range may be set to a temperature range above the upper-limit temperature of the target temperature range.

The power controller 52 may be configured to, if deciding to increase power consumption of the compressor 25, modify the target temperature range so as to increase the power consumption of the compressor 25. More specifically, in heating, the target temperature range may be extended in a direction towards high temperatures. In cooling, the target temperature range may be extended in a direction towards low temperatures. With such a modified target temperature range, the power controller 52 may feedback control the compressor 25 to increase the power consumption of the compressor 25 such that the internal cabin temperature is kept within the target temperature range.

The drive system 10 includes, as an accessory, the converter 27 that convey power between the high-voltage battery 20 and the low-voltage battery 21. The power controller 52 may be configured to, based on the SOC of the high-voltage battery 20, the SOC of the low-voltage battery 21, and total power consumption of the accessories, increase a running time of the converter 27 to increase the total power consumption. More specifically, the power controller 52 may be configured to, based on the SOC of each of the high-voltage battery 20 and the low-voltage battery 21, determine whether to increase the power consumption of the converter 27 so as to cause neither over-charge nor over-discharge of each battery 20, 21, and if deciding to increase the power consumption of the converter 27, then determine an increment of the power consumption. The power controller 52 may be configured to, if deciding to increase the power consumption of the converter 27, increase an upper limit of charging power for each battery 20, 21 or power consumption of the low-voltage accessories 24 as compared with in normal operation.

Conditions used by the power controller 52 to distribute the generated power by the motor generator 22 may be stored in the drive ECU 50 as a data table. For example, the data table as shown in FIG. 3 may be stored in the drive ECU 50.

The power controller 52 is configured to, based on the high-voltage SOC of the high-voltage battery 20 and the low-voltage SOC of the low-voltage battery 21, select one of "preferred", "non-preferred", and "inhibited" as a priority level of a power demand of the converter 27. The power controller 52 is further configured to select one of "cooling", "heating", and "OFF" as an internal cabin air conditioning state. The power controller 52 is configured to, based on a detection value output from a temperature sensor that detects an internal cabin temperature and a target temperature range, determine whether the internal cabin temperature is "Low", "Within Target Temperature Range", or "High". With reference to FIG. 3, based on the power supply to the converter 27 (the first column of FIG. 3), the air conditioning state (the second column of FIG. 3), the internal cabin temperature (the third column of FIG. 3), power distribution to the accessories may be selected from "increasing power consumption of the converter 27", "increasing power consumption of the compressor 25", and "withholding increasing power consumption".

As shown in FIG. 3, the power controller 52 acquires the high-voltage SOC and the low-voltage SOC. If the high-voltage battery 20 or the low-voltage battery 21 is in greater need of charge, the power controller 52 determines that a power demand of the converter 27 has a high priority. When the power demand of the converter 27 has a higher priority than that of the compressor 25, the power controller 52 increases power consumption of the converter 27 in preference to power consumption of the compressor 25. More specifically, when the power demand of the converter 27 is "preferred", the power consumption of the converter 27 is increased while the power consumption of the compressor 25 is not increased. When the power demand of the converter 27 is "inhibited", the power consumption of the compressor 25 is increased as appropriate while the power consumption of the converter 27 is not increased. When the power demand of the converter 27 is "non-preferred", the power consumption of the compressor 25 is increased in preference to power consumption of converter 27 from the point of view of reducing charging and discharging loss of each battery 20, 21. Preferably, in such a case, the power consumption of the converter 27 may be increased only when there is surplus power.

In the example of FIG. 3, the forbidden temperature range in cooling is set below the lower limit temperature of the target temperature range. The forbidden temperature range in heating is set above the upper limit temperature of the target temperature range. The power controller 52 is configured to, in cooling, if the internal cabin temperature is within the target temperature range or above the target temperature range, increase power consumption of the compressor 25, and if the internal cabin temperature is below the target temperature range, withhold increasing power consumption of the compressor 25. The power controller 52 is configured to, in heating, if the internal cabin temperature is within the target temperature range or below the target temperature range, increase power consumption of the compressor 25, and if the internal cabin temperature is above the target temperature range, withhold increasing power consumption of the compressor 25.

The power controller 52 is configured to, based on a running state of the vehicle 11, determine whether to increase the power consumption of the accessories. The running state of the vehicle can be recognized from driver's operational inputs or information acquired from the information terminal 31 and the sensors 32. For example, when information indicating that the vehicle 11 has approached the destination has been acquired from the information terminal 31, such as a navigation system or GPS, the vehicle 11 is expected to be parked. Therefore, in such a case, the power controller 52 may be configured to withhold increasing power consumption of the accessories.

FIG. 4 illustrates a flowchart of power control processing performed by the ECU 40. The ECU 40 is configured to acquire information from the information terminal 31, the sensors 32, the rechargeable batteries, such as the high-voltage battery 20, and the accessories, such as the compressor 25, to control the rechargeable batteries and the accessories. FIG. 4, illustrates the power control processing for increasing power consumption of the accessories, providing that the SOCs of the high-voltage battery 20 and the low-voltage battery 21 are maintained.

At step S101, the ECU 40 determines whether or not the motor generator 22 is generating electrical power. If the motor generator 22 is generating electrical power, the process flow proceeds to step S102. Otherwise, the process flow ends.

At step S102, the ECU 40 determines whether or not the SOC of the high-voltage battery 20 (i.e., the high-voltage SOC) is equal to or greater than a high-voltage SOC threshold X1. If the high-voltage SOC is equal to or greater than the high-voltage SOC threshold X1, then the process flow proceeds to step S103. Otherwise, the process flow ends.

At step S103, the ECU 40 determines whether or not generated power W1 by the motor generator 22 exceeds power consumption Y1 of the accessories, that is, W>Y1, where there is a surplus of generated power W1 by the motor generator 22. If W>Y1, then the process flow proceeds to step S104. If W1≤Y1, that is, if there is no surplus power, then the process flow ends.

At step S104, the ECU 40 calculates a distribution of the surplus power. More specifically, the ECU 40 determines a distribution of the surplus power between charging power to charge the respective batteries 20, 21 and power consumption of the respective accessories, and determines power consumption breakdowns for the accessories, that is, an amount of power to be distributed to each of the plurality of accessories.

Figure 5:
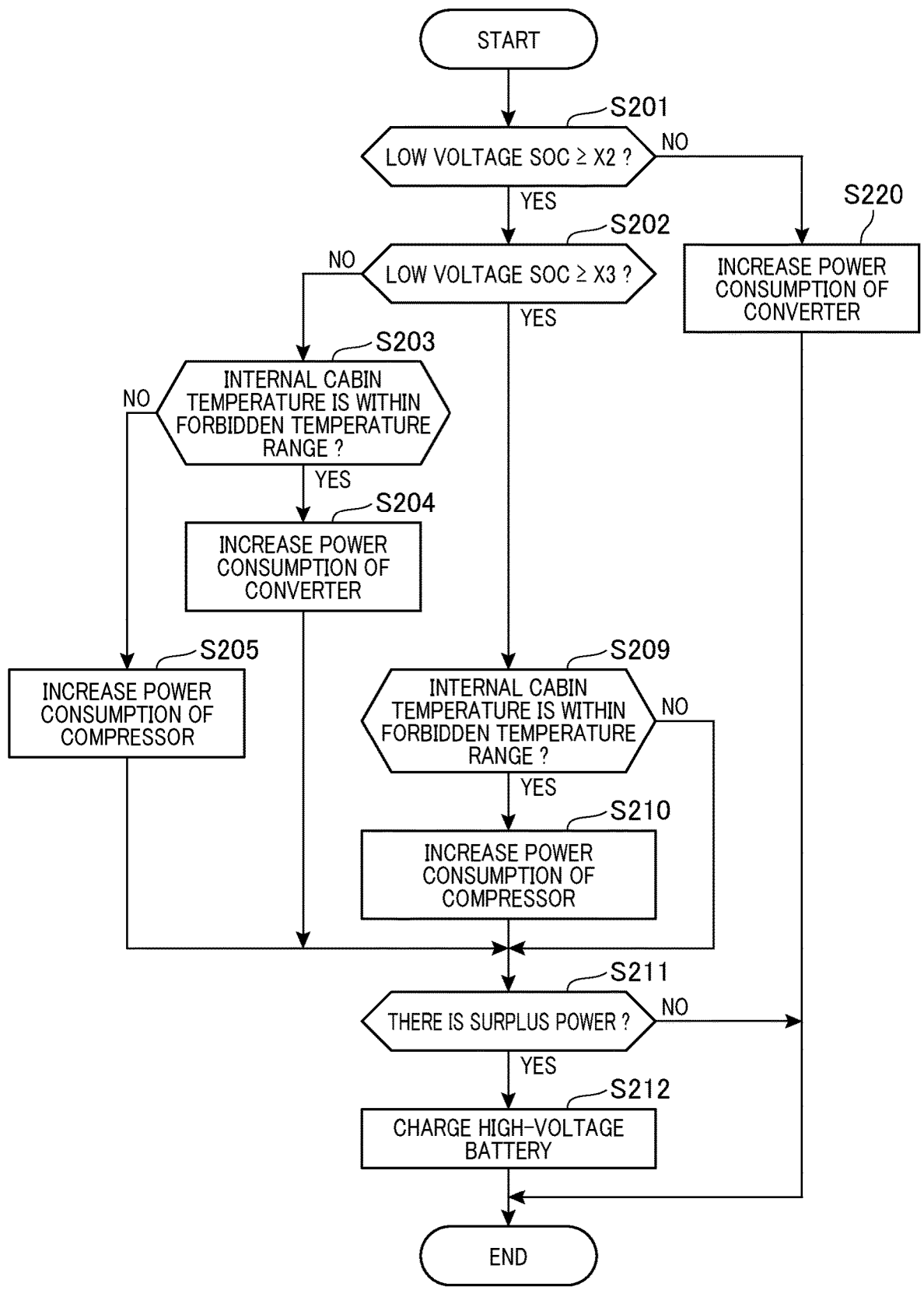
FIG. 5 is a flowchart of power distribution determination processing according to a first embodiment.

FIG. 5 illustrates an example of surplus power distribution determination processing performed at step S104. The surplus power distribution determination processing of FIG. 5 is performed based on the data table of FIG. 3.

At step S201, the ECU 40 determines whether or not the SOC of the low-voltage battery 21 (i.e., the low-voltage SOC) is equal to or greater than a low-voltage SOC threshold X2. If the low-voltage SOC is equal to or greater than the low-voltage SOC threshold X2, that is, the low-voltage SOC≥X2, the power demand of the converter 27 is "non-preferred" or "inhibited" as shown in FIG. 3 and then the process flow proceeds to step S202. If the low-voltage SOC<X2, the low-voltage SOC≥X2, the power demand of the converter 27 is "preferred" as shown in FIG. 3 and then the process flow proceeds to step S220. At step S220, the ECU 40 determines to increase power consumption of the converter 27. Then, the process flow ends.

At step S202, the ECU 40 determines whether or not the low-voltage SOC is equal to or greater than a charging threshold X3. The charging threshold X3 is a threshold for determining whether to charge the low-voltage battery 21. The charging threshold X3 is set greater than the low-voltage SOC threshold X2, that is, X2<X3. The charging threshold X3 does not necessarily have to be set to a SOC of the low-voltage battery 21 when the low-voltage battery 21 is fully charged. If the low-voltage SOC is equal to or greater than the charging threshold X3, the power demand of the converter 27 is "inhibited" as shown in FIG. 3 and then the process flow proceeds to step S209. If the low-voltage SOC is less than the charging threshold X3, the power demand of the converter 27 is "non-preferred" and then the process flow proceeds to step S203.

At step S203, the ECU 40 determines whether or not the internal cabin temperature is within a predetermined forbidden temperature range. In cooling, the forbidden temperature range is set below the lower limit temperature of the target temperature range. In heating, the forbidden temperature range is set above the upper limit temperature of the target temperature range. That is, if, in cooling, the internal cabin temperature is less than the lower limit temperature, then it is determined that the internal cabin temperature is within the forbidden temperature range. If, in cooling, the internal cabin temperature is equal to or greater than the lower limit temperature, then it is determined that the internal cabin temperature is out of the forbidden temperature range. If, in heating, the internal cabin temperature is greater than the upper-limit temperature, it is determined that the internal cabin temperature is within the forbidden temperature range. If, in heating, the internal cabin temperature is equal to or less than the upper-limit temperature, it is determined that the internal cabin temperature is out of the forbidden temperature range.

In the case where the internal cabin temperature is within the forbidden temperature range, increasing power consumption of the compressor 25 will lead to an excessively high or low internal cabin temperature. Thus, the process flow proceeds to step S204, where the ECU 40 determines to withhold increasing power consumption of the compressor 25 and increase power consumption of the converter 27. Increasing the power consumption of the converter 27 enables applying generated power by the motor generator 22 to power consumption of the low-voltage accessories 24 and charging power to charge the low-voltage battery 21. In order to increase the power consumption of the converter 27, power consumption of the low-voltage accessories 24 may be increased and the upper limit of charging power to charge the low-voltage battery 21 may be increased. Subsequently to step S204, the process flow proceeds to step S211.

In the case where the internal cabin temperature is out of the forbidden temperature range, power consumption of the compressor 25 is allowed to be increased. Therefore, the process flow proceeds to step S205, where the ECU 40 determines to withhold increasing power consumption of the converter 27 and increase power consumption of the compressor 25. Increasing the power consumption of the compressor 25 enables enhancing air conditioning within the cabin while keeping the internal cabin temperature within the target temperature range.

The power consumption of the compressor 25 is increased such that the internal cabin temperature is kept within the target temperature range. More specifically, when performing heating operation, regardless of the set temperature, the power consumption of the compressor 25 may be increased until the upper-limit temperature of the target temperature range is reached. When performing cooling, regardless of the set temperature, the power consumption of the compressor 25 may be increased until the lower-limit temperature of the target temperature range is reached. In addition, the power consumption of the compressor 25 may be increased by modifying the target temperature range for the internal cabin temperature. More specifically, when performing heating operation, the target temperature range is extended in a direction towards high temperatures. When performing cooling, the target temperature range is extended in a direction towards low temperatures. Subsequently to step S205, the process flow proceeds to step S211.

At step S209, as in step S203, the ECU 40 determines whether or not the internal cabin temperature is within the predetermined forbidden temperature range. If the internal cabin temperature is within the predetermined forbidden temperature range, then the process flow proceeds to step S210, where the ECU 40 determines to increase power consumption of the compressor 25. If the internal cabin temperature is out of the forbidden temperature range, then the process flow proceeds to step S211.

At step S210, as in step S205, the ECU 40 extends the target temperature range in a direction towards low or high temperatures and increase the power consumption of the compressor 25 while keeping the internal cabin temperature within the predetermined target temperature range. Thereafter, the process flow proceeds to step S211.

At step S211, the ECU 40 determines whether or not there is a surplus of generated power W1 by the motor generator 22. If there is surplus power, the process flow proceeds to step S212, where the ECU 40 determines to charge the high-voltage battery 20. Then the process flow ends. If there is no surplus power, the process flow immediately ends.

Upon completion of the processing at step S104 shown in FIG. 5, each battery 20, 21 is charged and the power consumption Y1 of the accessories is increased according to the calculated distribution of surplus power at step S105. Thereafter, the process flow of FIG. 4 ends.

In the ECU 40 of the vehicle drive system 10 of the present embodiment, the selector 51 is configured to, during power generation by the motor generator 22, selects the motor generator 22 as a power source for the accessories in preference to the rechargeable batteries (i.e., the high-voltage battery 20 and the low-voltage battery 21) to supply power from the motor generator 22 to the accessories. The power controller 52 is configured to, if generated power by the motor generator 22 exceeds power consumption of the accessories, increase the power consumption of the accessories to thereby reduce surplus power to be charged in the rechargeable batteries. Adjusting power consumption of the accessories in response to generated power by the motor generator 22 can prevent the generated power by the motor generator 22 from being charged in the rechargeable batteries and thereafter supplied from the rechargeable batteries to the accessories, which can reduce power loss caused by charging or discharging of the rechargeable batteries.

The ECU 40 is configured to, if the high-voltage SOC of the high-voltage battery 20 is equal to or greater than the high-voltage SOC threshold X1 or the low-voltage SOC of the low-voltage battery 21 is equal to or greater than the low-voltage SOC threshold X2, increase power consumption of the accessories. The ECU 40 is configured to, if the high-voltage SOC of the high-voltage battery 20 is less than the high-voltage SOC threshold X1 and the low-voltage SOC of the low-voltage battery 21 is less than the low-voltage SOC threshold X2, inhibit the increase of the power consumption of the accessories. As described above, if the SOC of each battery 20, 21 is not sufficiently high, generated power by the motor generator 22 is preferentially used to charge the batteries 20, 21, which enables providing a balance between properly maintaining the SOC of each battery 20, 21 and reducing power loss caused by charging or discharging the rechargeable batteries with generated power by the motor generator 22.

In addition, the ECU 40 is configured to, during normal operation where there is no need to consume surplus power of the motor generator 22, feedback controls the compressor 15 such that the internal cabin temperature is kept within the target temperature range. The ECU 40 is configured to, when consuming the surplus power of the motor generator 22, increase the power consumption of the compressor 25 even if the internal cabin temperature is within the target temperature range. Even if the internal cabin temperature is increased to be excessively high or decreased to be excessively low with respect to the set temperature by consuming the surplus power of the motor generator 22, the internal cabin temperature can totally be properly maintained by subsequently reducing the power consumption of the compressor 25 when the motor generator 22 is not generating power. With this configuration, the power consumption of the compressor 25 is controlled in response to whether there is a surplus of generated power by the motor generator 22, which can ensure a comfortable internal cabin temperature while suppressing charge loss.

Second Embodiment

Figure 6:
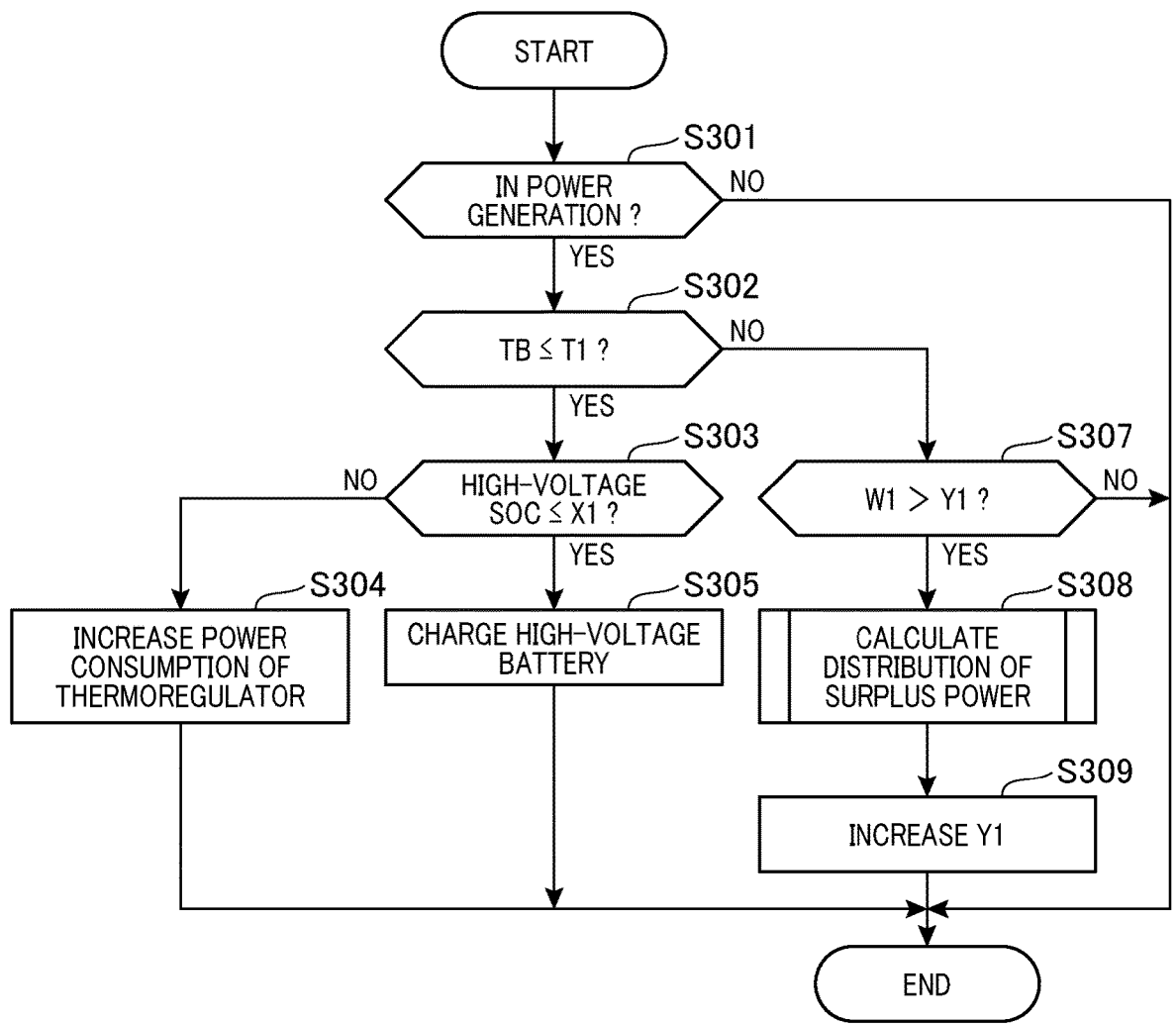
FIG. 6 is a flowchart of drive control processing according to a second embodiment.

FIG. 6 illustrates a flowchart of power control processing performed by the ECU 40 according to a second embodiment. FIG. 6 illustrates the power control processing for increasing power consumption of the thermoregulator 23 in preference to power consumption of the accessories other than the thermoregulator 23, providing that a temperature of the high-voltage battery 20 (referred to as a battery temperature TB) is equal to or less than a predetermined heating threshold T1.

At step S301, the ECU 40 determines whether or not the motor generator 22 is generating electrical power. If the motor generator 22 is generating electrical power, then the process flow proceeds to step S302. Otherwise, the process flow ends.

At step S302, the ECU 40 determines whether or not the temperature TB of the high-voltage battery 20 is equal to or less than the heating threshold T1. If TB≤T1, the high-voltage battery 20 needs to be heated and thus the process flow proceeds to step S303. If TB>T1, there is no need to heat the high-voltage battery 20 and thus the process flow proceeds to step S307.

At step S303, the ECU 40 determines whether or not the SOC of the high-voltage battery 20 (i.e., the high-voltage SOC) is equal to or less than a predetermined high-voltage SOC threshold X1. If the high-voltage SOC>X1 where the high-voltage battery 20 is fully charged, then the process flow proceeds to step S304. At step S304, the ECU 40 determines to increase power consumption of the thermoregulator 23 to heat the high-voltage battery 20. If the high-voltage SOC≤X1 where there is room for charging of the high-voltage battery 20, the process flow proceeds to step S305. At step S305, the ECU 40 determines to charge the high-voltage battery 20. At step S304, energization of the thermoregulator 23 enables heating the high-voltage battery 20. At step S305, charging the high-voltage battery 20 causes heat generation of an internal resistance of the high-voltage battery 20. Thus, the high-voltage battery 20 is heated when charged. If the ECU 40 determines, based on the high-voltage SOC, that there is room for charging of the high-voltage battery 20, the ECU 40 chooses to heat the high-voltage battery 20 by charging the high-voltage battery 20, which enables efficient use of power.

At step S307, the ECU 40 determines whether or not generated power W1 by the motor generator 22 exceeds power consumption Y1 of the accessories, that is, W>Y1, where there is a surplus of generated power W1 by the motor generator 22. If W>Y1, then the process flow proceeds to step S308. If W1≤Y1 where there is no surplus power, then the process flow ends.

At step S308, the ECU 40 calculates a distribution of the surplus power. More specifically, the ECU 40 determines a distribution of the surplus power between charging power to charge the respective batteries 20, 21 and power consumption of the respective accessories, and determines power consumption breakdowns for the accessories, that is, an amount of power to be distributed to each of the plurality of accessories. At step S308, as in step S104, the ECU 40 may calculate power consumption breakdowns for the accessories by performing the processing shown in FIG. 5 based on the data table of FIG. 3.

Upon completion of the processing at step S308 shown in FIG. 5, each battery 20, 21 is charged and the power consumption Y1 of the accessories is increased according to the calculated distribution of surplus power at step S309. Thereafter, the process flow of FIG. 6 ends.

Figure 7A:
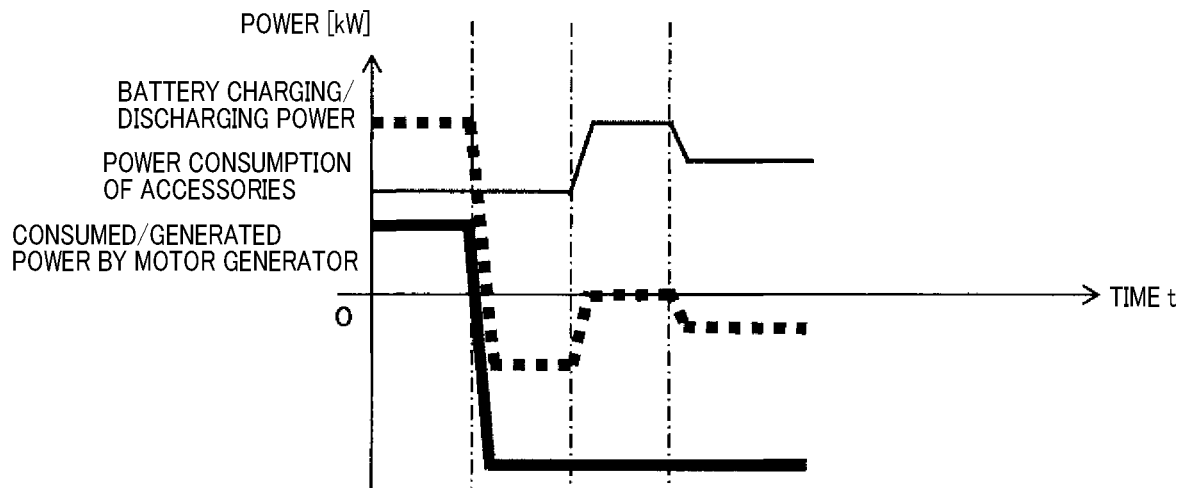
FIGS. 7A-7D are a timing diagram of power distribution according to the second embodiment.
Figure 7B:
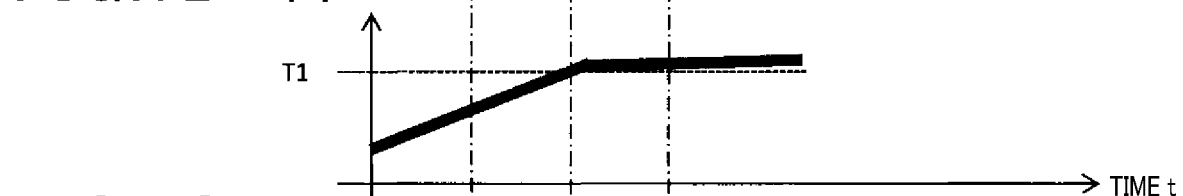
Figure 7C:
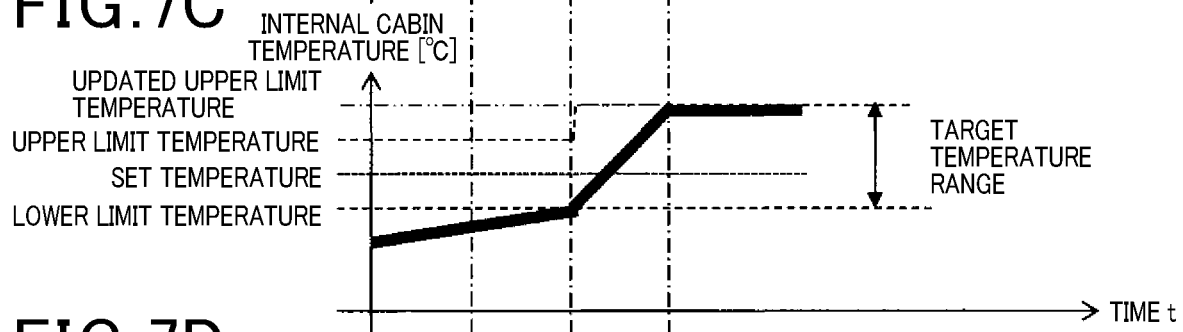
Figure 7D:
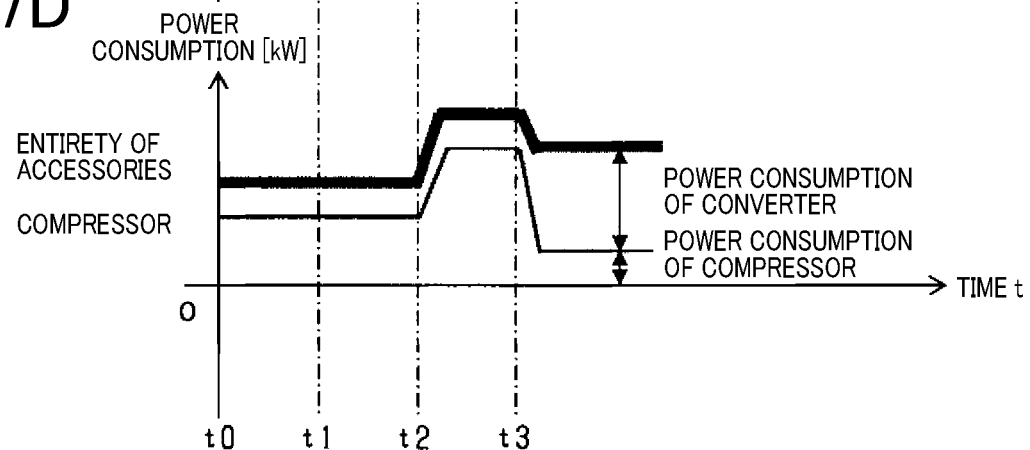

FIGS. 7A-7D illustrate a timing diagram during processing shown in FIG. 6. In FIGS. 7A-7D, the horizontal axis corresponds to passage of time t. In FIG. 7A, the vertical axis corresponds to power. In FIG. 7B, the vertical axis corresponds to the temperature TB of the high-voltage battery 20. In FIG. 7C, the vertical axis corresponds to the internal cabin temperature. In FIG. 7D, the vertical axis corresponds to the power consumption of the accessories. In FIG. 7A, the broken line corresponds to discharging/charging power of the high-voltage battery 20, and the heavy line corresponds to the power consumption/generated power by the motor generator 22, the thin line corresponds to the power consumption of the accessories.

In FIG. 7A, the charging power and the generated power are indicated as negative power, and the discharging power and the power consumption are indicated as positive power. In FIG. 7D, the power consumption of the entirety of accessories is indicated by a heavy line, and the power consumption of the compressor 25 is indicated by a thin line.

During a time period of times t0 to t1, the motor generator 22 serves as an electric motor that drives the wheels 12 in power running operation. The motor generator 22, the compressor 25, and the converter 27 are powered by discharging power of the high-voltage battery 20. The low-voltage accessories 24 are powered by discharging power of the low-voltage battery 21. As shown in FIG. 7B, the temperature TB of the high-voltage battery 20 increases as the high-voltage battery 20 discharges. The compressor 25 being supplied with power, the internal cabin temperature increases to within the target temperature range as shown in FIG. 7C. The target temperature range is a temperature range defined by a lower limit temperature below a temperature set by a driver's input and an upper-limit temperature above the set temperature.

As shown in FIG. 7A, at time t1, the motor generator 22 transitions from the power running operation to the regenerative operation, whereby generated power by the motor generator 22 is applied to power consumption of the accessories. The temperature TB of the high-voltage battery 20 is below the heating threshold T1 and the high-voltage SOC is below the high-voltage SOC threshold X1. Thus, generated power by the motor generator 22 is applied to charging of the high-voltage battery 20. The temperature of the high-voltage battery 20 increases as the high-voltage battery 20 is charged, as shown in FIG. 7B. The power source is changed from the high-voltage battery 20 to the motor generator 22 while power supply to the compressor 25 is continued. Thus, the internal cabin temperature increases as shown in FIG. 7C.

At time t2, as shown in FIG. 7B, upon the temperature of the high-voltage battery 20 exceeding the heating threshold T1, charging of the high-voltage battery 20 is suspended as shown in FIG. 7A while generated power by the motor generator 22 remains unchanged. Thus, charging power applied to charging of the high-voltage battery 20 becomes surplus power. As shown in FIGS. 7A and 7D, power consumption of the accessories is increased to consume this surplus power. More specifically, power consumption of the compressor 25 is increased.

As shown in FIG. 7C, at time t2, the upper-limit temperature of the target temperature range is updated to an updated upper-limit temperature higher than the upper-limit temperature. As shown in FIGS. 7A, 7C, and 7D, the power consumption of the compressor 25 is increased such that the internal cabin temperature rises to the updated upper-limit temperature. In normal operation where there is no need to increase power consumption of the accessories to consume the surplus power, the internal cabin temperature is feedback controlled within the target temperature range. To consume the surplus power, power consumption of the compressor 25 is increased even if the internal cabin temperature is within the target temperature range. Updating the upper-limit temperature to the updated upper-limit temperature allows the power consumption of the compressor 25 to be further increased as compared with before update.

During a time period of times t2 to t3, the power consumption of the compressor 25 is increased such that surplus power of the motor generator 22 is consumed by the accessories. As shown in FIGS. 7C and 7D, the power consumption of the compressor 25 is continued to be increased even after the internal cabin temperature has exceeded the set temperature. At time t3, as shown in FIG. 7C, upon the internal cabin temperature exceeding the updated upper-limit temperature, the power consumption of the compressor 25 ceases to be increased and power consumption of the converter 27 is increased. Reducing the power consumption of the compressor 25 can prevent the internal cabin temperature from becoming too high, exceeding the updated upper-limit temperature. At time t3, the internal cabin temperature is above the normal target temperature range, though. After the motor generator 22 transitions from the regenerative operation to the power running operation, the power consumption of the compressor 25 is decreased as compared with in normal, whereby the internal cabin temperature returns to within the target temperature range, which can reliably ensure a comfortable internal cabin temperature while reducing charge loss.

After time t3, the power consumption of the converter 27 is increased to consume the surplus power of the motor generator 22. The remainder of the surplus power that the accessories can not consume is charged in the high-voltage battery 20 as shown in FIG. 7A. Thus, as shown in FIG. 7B, charging the high-voltage battery 20 will lead to a slight increase of the temperature TB of the high-voltage battery 20.

In the present embodiment, the power controller 52 is configured to, if the temperature TB of the high-voltage battery 20 is equal to or less than the heating threshold T1, inhibit an increase of power consumption of the accessories other than the thermoregulator 23 and preferentially increase power consumption of the thermoregulator 23 or charge the high-voltage battery 20, such that the temperature TB of the high-voltage battery 20 can be kept at a suitable temperature. This allows the vehicle 11 to rapidly transition from the warming-up state, in which the high-voltage battery 20 is warmed, to a normal running state.

Particularly, in an electric vehicle (EV), such as the vehicle 11 having no internal-combustion engine, exhaust gas from the internal-combustion engine can not be used to warm up the high-voltage battery 20. Instead, preferably, control for rapidly heating the high-voltage battery 20 can be used.

The power controller 52 is configured to, if the temperature TB of the high-voltage battery 20 is above the heating threshold T1, apply surplus power of the motor generator 22 to increasing power consumption of the accessories. This can prevent generated power by the motor generator 22 from being charged in the rechargeable batteries and thereafter supplied from the rechargeable batteries to the accessories, which can reduce power loss caused by charging or discharging of the rechargeable batteries.

Third Embodiment

Figure 8:
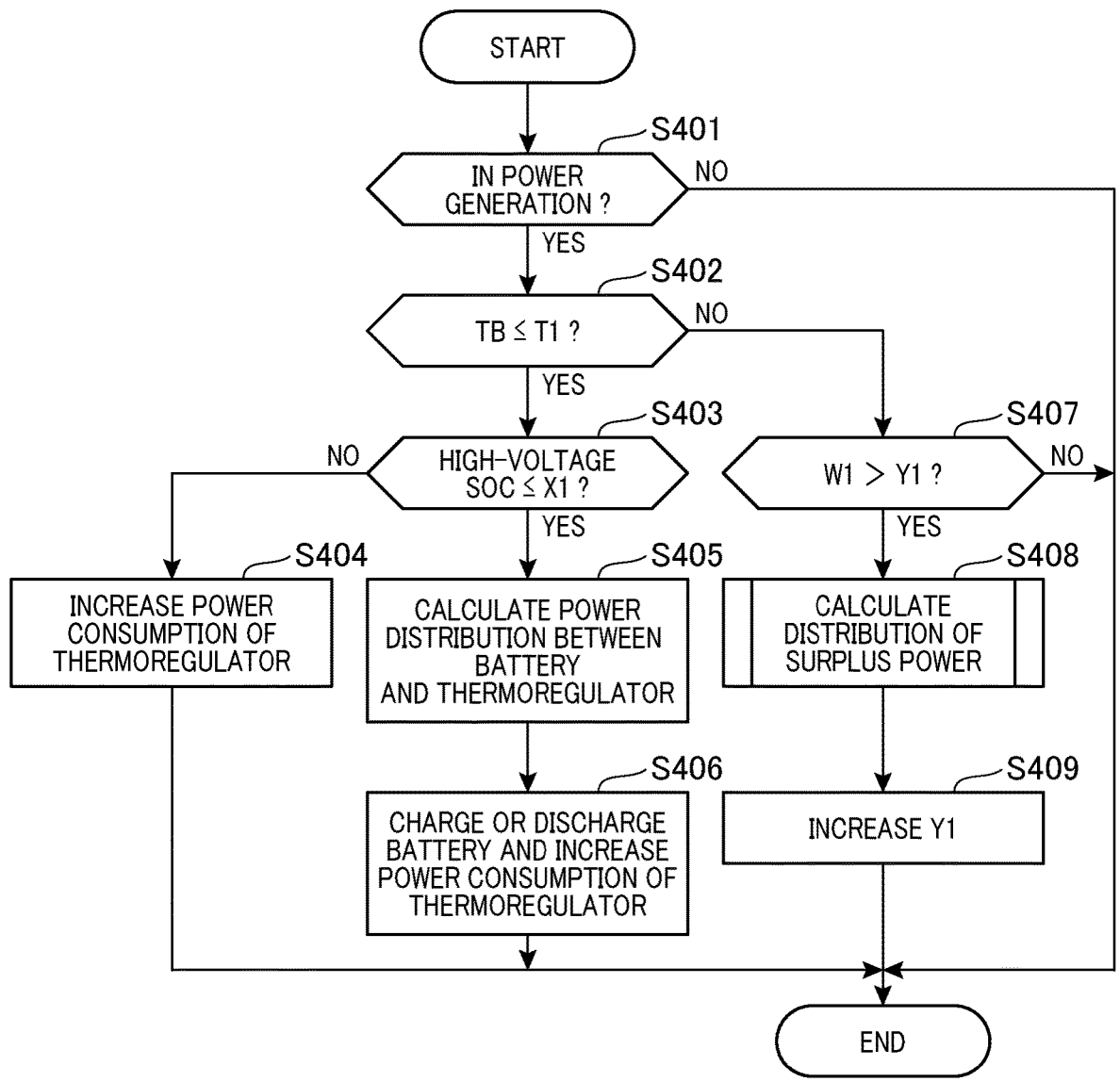
FIG. 8 is a flowchart of drive control processing according to a third embodiment.

FIG. 8 illustrates a flowchart of power control processing performed by the ECU 40 according to a second embodiment. FIG. 8 illustrates the power control processing similar to that of the second embodiment in that the temperature TB of the high-voltage battery 20 is preferentially maintained, but different from the second embodiment in that if the high-voltage battery 20 is not fully charged, charging power of the high-voltage battery 20 and power consumption of the thermoregulator 23 are optimized. Operations at steps S401-S404, and S407-S409 shown in FIG. 8 are respectively similar to operations at step S301-S304, and S307-S309 shown in FIG. 6 and thus will not be redundantly described.

Referring to FIG. 8, at step S403, the ECU 40 determines whether or not the high-voltage SOC of the high-voltage battery 20 is equal to or less than the predetermined high-voltage SOC threshold X1. If the high-voltage SOC≤X1, then the process flow proceeds to step S405. At step S405, to control the temperature TB of the high-voltage battery 20 to a target temperature, the ECU 40 calculates an optimal distribution of the surplus power between charging power of the high-voltage battery 20 and power consumption of the thermoregulator 23. The ECU 40 stores a relationship between charging/discharging power of the high-voltage battery 20 and an amount of heating of the high-voltage battery 20 caused by charging/discharging the high-voltage battery 20 and a relationship between power consumption of the thermoregulator 23 and an amount of heating of the thermoregulator 23 in the form of equations or tables. Based on these relationships and generated power by the motor generator 22, the ECU 40 can determine a power distribution between the high-voltage battery 20 and the thermoregulator 13. Subsequently to step S405, the process flow proceeds to step S406. At step S406, according to the power distribution determined at step S405, the ECU 40 charges or discharges the high-voltage battery 20 and increase the power consumption of the thermoregulator 23.

Figure 9A:
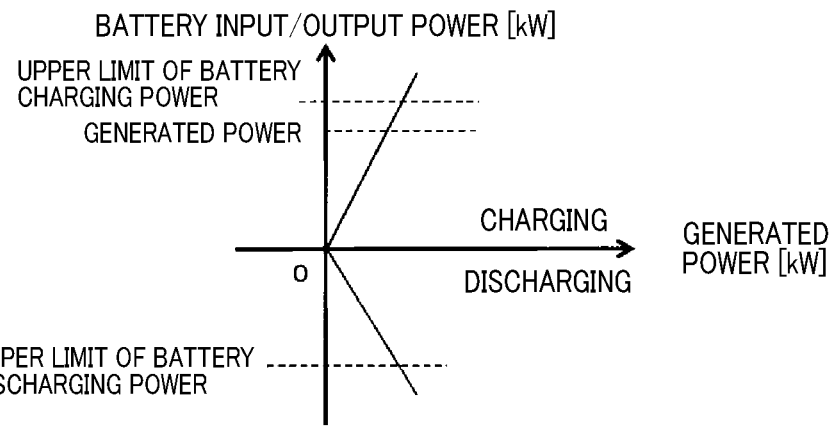
FIGS. 9A-9C are an illustration of power distribution according to the third embodiment.
Figure 9B:
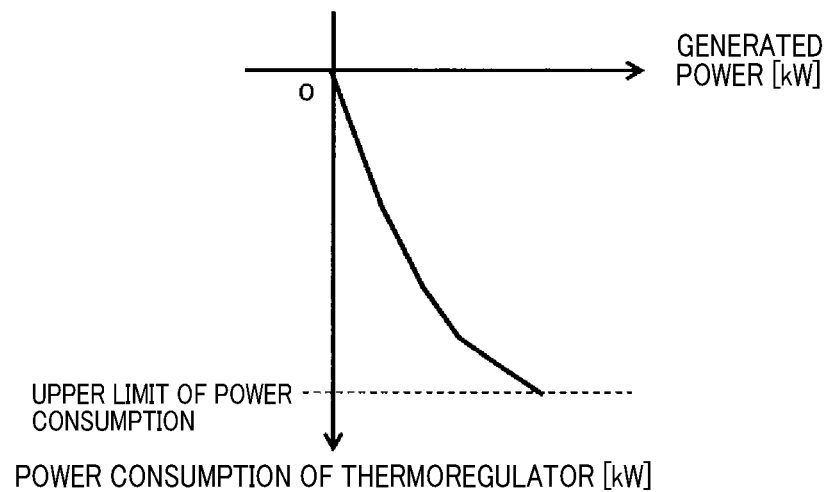

The processing at step S405 for calculating a distribution of generated power W1 by the motor generator 22 between charging power of the high-voltage battery 20 and power consumption of the thermoregulator 23 will now be described with reference to FIG. 9. As shown in FIG. 9A, as charging power or discharging power of the high-voltage battery 20 increases, an amount of heating generated during charging or discharging of the high-voltage battery 20 increases. In addition, as shown in FIG. 9B, as power consumption of the thermoregulator 23 increases, an amount of heating generated by the thermoregulator 23 increases.

Figure 9C:
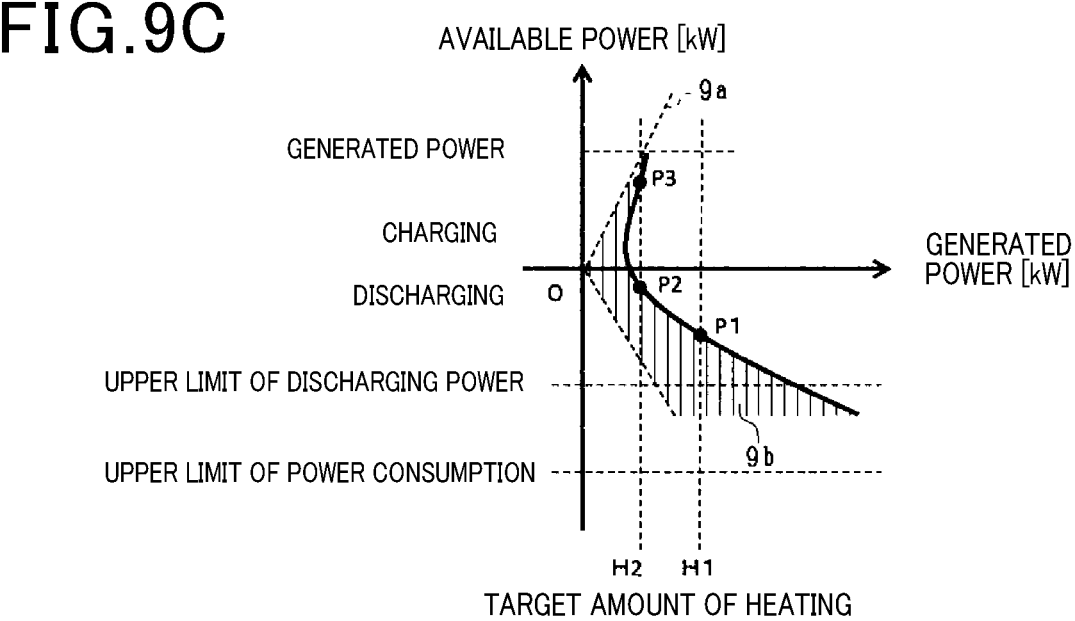

FIG. 9C illustrates a total amount of heating of the high-voltage battery 20 and the thermoregulator 23. In FIG. 9C, a curve represents a sum of the amount of heating indicated by FIG. 9A and the amount of heating indicated by FIG. 9B, where the amount of heating shown in FIG. 9A is indicated by a broken line 9a and the amount of heating shown in FIG. 9B is indicated by a shaded region 9b. In FIG. 9C, the upper end of power consumption of the thermoregulator 13 (i.e., a point where power consumption=0) shown in FIG. 9B is positioned on the broken line indicating the generated power shown in FIG. 9A. Summing the amount of heating corresponding to charging/discharging power of the high-voltage battery 20 (as the solid line in FIG. 9A) and the amount of heating corresponding to power consumption of the thermoregulator 13 (as the curve in FIG. 9B) based on the generated power can yield an amount of heating corresponding to power available to the high-voltage battery 20 and the thermoregulator 13 as the curve in FIG. 9C.

The ECU 40 can calculate a target amount of heating required to control the temperature of the high-voltage battery 20 to a target temperature based on a current temperature of the high-voltage battery 20 and the target temperature of the high-voltage battery 20. Charging/discharging power of the high-voltage battery 20 and an amount of heating of the thermoregulator 23 can be derived by calculating intersections of the curve corresponding to the total amount of heating and a vertical line corresponding to the target amount of heating as shown in FIG. 9C.

For example, when the target amount of heating is H1, as shown in FIG. 9C, the curve and the line corresponding to the target amount of heating H1 intersect at a single intersection P1. This intersection P1 yields discharging power of the high-voltage battery 20 (that is an amount of power to be discharged from the high-voltage battery 20) and power consumption of the thermoregulator (that is an amount of power to be consumed by the thermoregulator 23). A power distribution between the high-voltage battery 20 and the thermoregulator 23 corresponding to the intersection P1 can yield the target amount of heating H1.

For example, when the target amount of heating is H2, as shown in FIG. 9C, the curve and the target mount of heating H2 intersect at two intersections P2, P3. The intersection P2 resides on the side of charging the high-voltage battery 20. The intersection P3 resides on the side of discharging the high-voltage battery 20. In such a case where there are a plurality of intersections, selecting the intersection P3 on the side of charging the high-voltage battery 20 can provide a longer travel distance of the vehicle 11 as compared with a case where the intersection P2 on the side of discharging the high-voltage battery 20 is selected. That is, this intersection P3 yields discharging power of the high-voltage battery 20 and power consumption of the thermoregulator 23. A power distribution between the high-voltage battery 20 and the thermoregulator 23 corresponding to the intersection P3 can achieve the target amount of heating H2 and ensure a longer travel distance. Therefore, in cases where there are a plurality of power distributions that can achieve the target amount of heating, preferentially selecting a power distribution such that the high-voltage battery 20 is charged enables more efficient use of surplus power of the motor generator 22.

Fourth Embodiment

Figure 10:
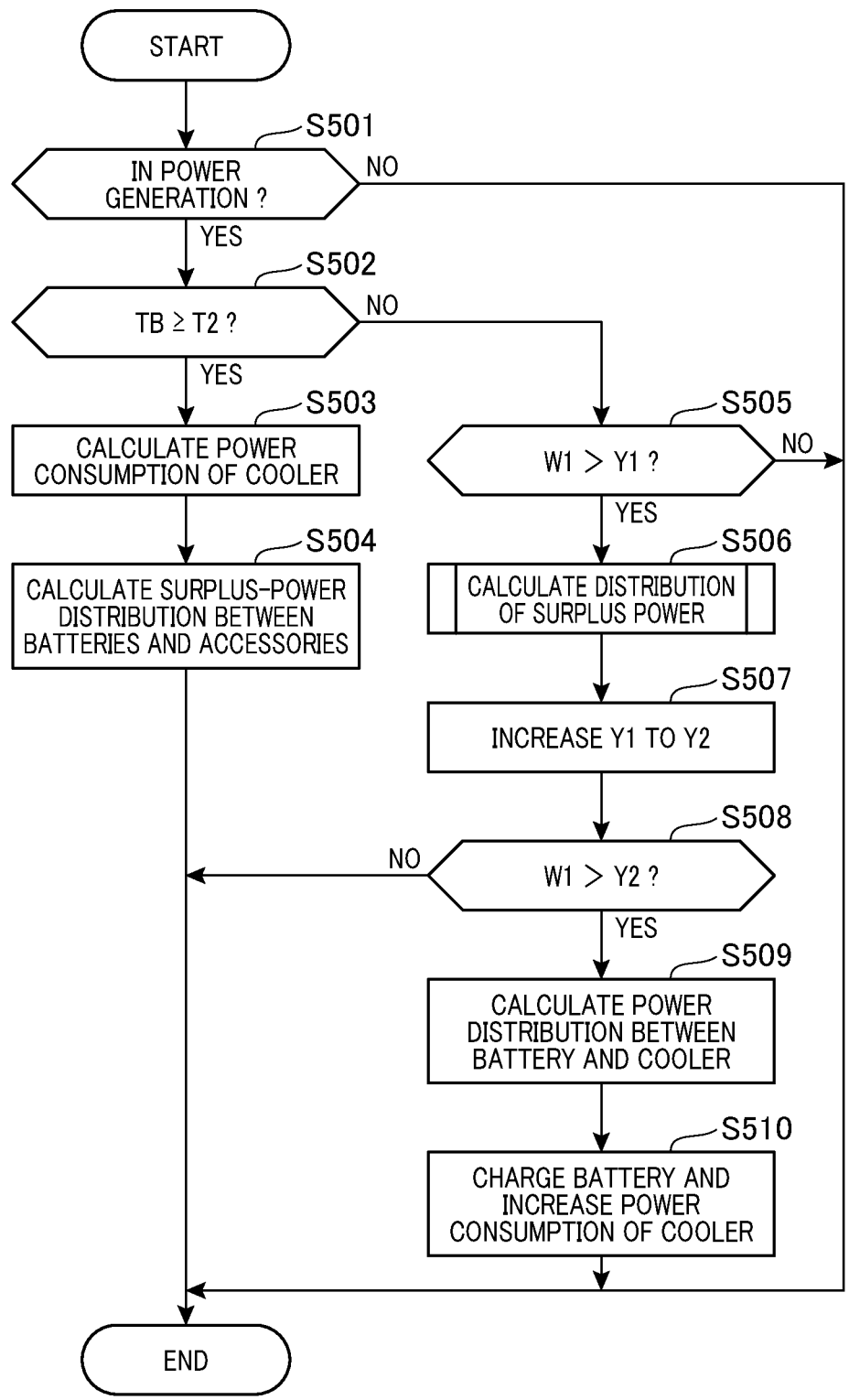
FIG. 10 is a flowchart of drive control processing according to a fourth embodiment.

FIG. 10 illustrates a flowchart of power control processing performed by the ECU 40 according to a fourth embodiment. In the fourth embodiment, generated power by the motor generator 22 is supplied to the cooler 28 in preference to the accessories other than the cooler 28, thereby preferentially cooling the high-voltage battery 20.

At step S501, the ECU 40 determines whether or not the motor generator 22 is generating electrical power. If the motor generator 22 is generating electrical power, then the process flow proceeds to step S502. Otherwise, the process flow ends.

At step S502, the ECU 40 determines whether or not the temperature TB of the high-voltage battery 20 is equal to or greater than a predetermined cooling threshold T2. If TB≥T2, the high-voltage battery 20 needs to be cooled and thus the process flow proceeds to step S503. If TB<T2, there is no need to cool the high-voltage battery 20 and thus the process flow proceeds to step S505.

At step S503, the ECU 40 can calculate a target amount of cooling required to control the temperature TB of the high-voltage battery 20 to a target temperature based on a current temperature of the high-voltage battery 20 and the target temperature of the high-voltage battery 20, thereby calculating power consumption of the cooler 28 for ensuring the target amount of cooling. Power consumption of the cooler 28 is calculated in combination with an amount of heating caused by charging or discharging the high-voltage battery 20. Thereafter, the process flow proceeds to step S504.

At step S504, the ECU 40 subtracts the power consumption of the cooler 28 from generated power by the motor generator 22 to calculate remaining power and calculates a distribution of the remaining power. More specifically, the ECU 40 determines a distribution of the remaining power between charging power of each battery 20, 21 and power consumption of the accessories and determines power consumption breakdowns for the accessories. If the temperature TB≥T2, then at step S503 the ECU 40 ensures the power consumption of the cooler 28 and thereafter the process flow proceeds to step S504. The remaining power, if any, is distributed to the accessories after the power consumption of the cooler 28 is ensured, which enables reliably cooling the high-voltage battery 20. Subsequent to step S504, the process flow ends.

At step S505, the ECU 40 determines whether or not generated power W1 by the motor generator 22 exceeds power consumption Y1 of the accessories. If W1>Y1, the process flow proceeds to step S506. If W1≤Y1, the process flow ends. At step S506, the ECU 40 calculates surplus power and calculates a distribution of the surplus power. The process flow proceeds to step S507. At step S507, the ECU 40 calculates power consumption Y2 of the accessories after distribution of the surplus power to the accessories. Thereafter, the process flow proceeds to step S508.

At step S508, the ECU 40 determines whether or not generated power W1 by the motor generator 22 exceeds the power consumption Y2 of the accessories. If W1>Y2, the process flow proceeds to step S509, where the remainder of the surplus power that the accessories can not consume is charged in the high-voltage battery 20 or the like. If W1≤Y2 where generated power W1 can be consumed by increasing the power consumption of the accessories, then the process flow ends.

At step S509, the ECU 40 distributes surplus power after power consumption of the accessories is increased to Y2, that is, (W1-Y2), to charging power of the high-voltage battery 20 and power consumption of the cooler 28. As the surplus power (W1-Y2) is charged in the high-voltage battery 20, the temperature of the high-voltage battery 20 increases. Thus, to properly control the temperature of the high-voltage battery 20, power consumption of the cooler 28 also needs to be increased. The ECU 40 stores a relationship between charging/discharging power of the high-voltage battery 20 and an amount of heating of the high-voltage battery 20 caused by charging/discharging the high-voltage battery 20 and a relationship between power consumption of the cooler 28 and an amount of cooling (as a negative amount of heating) of the cooler 28 in the form of equations or tables, Based on these relationships, the ECU 40 can determine a power distribution between the high-voltage battery 20 and the cooler 28. Subsequently to step S509, the process flow proceeds to step S510. At step S510, according to the power distribution determined at step S509, the ECU 40 charges the high-voltage battery 20 and increases the power consumption of the cooler 28. This enables properly controlling the temperature of the high-voltage battery 20, thereby charging the high-voltage battery 20.

Figure 11A:
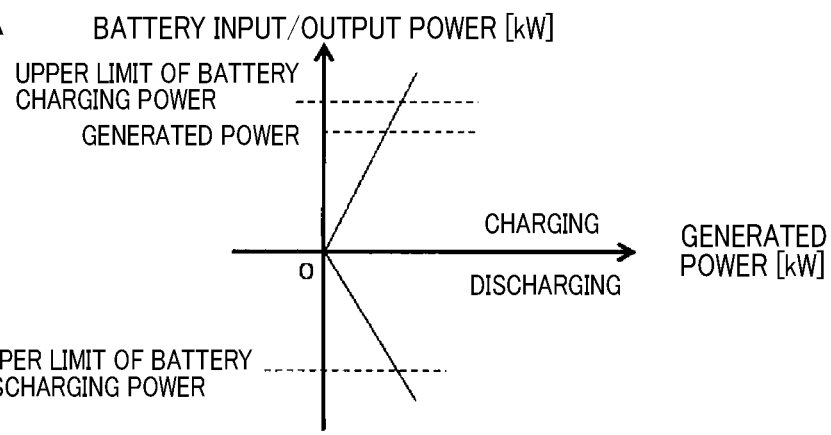
FIGS. 11A-11C are an illustration of power distribution according to the fourth embodiment.
Figure 11B:
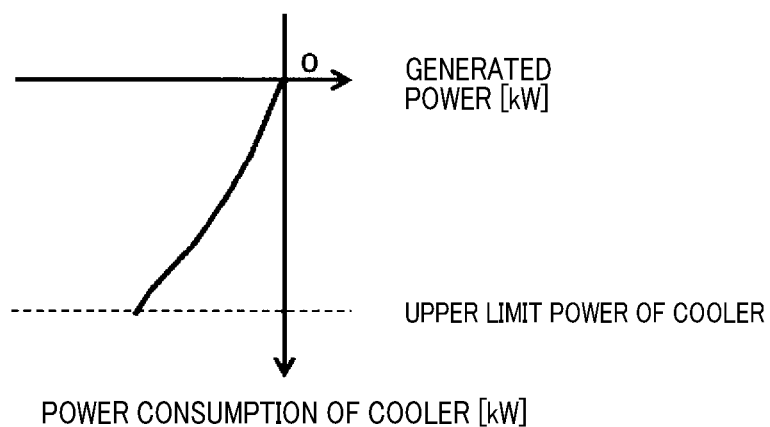

The processing at step S509 for calculating a distribution of generated power W1 by the motor generator 22 between charging power of the high-voltage battery 20 and power consumption of the cooler 28 will now be described with reference to FIG. 11. As shown in FIG. 11A, as charging power or discharging power of the high-voltage battery 20 increases, an amount of heating during charging or discharging of the high-voltage battery 20 increases. In addition, as shown in FIG. 11B, as power consumption of the cooler 28 increases, an amount of cooling, that is, an absolute value of a negative amount of heating, increases.

Figure 11C:
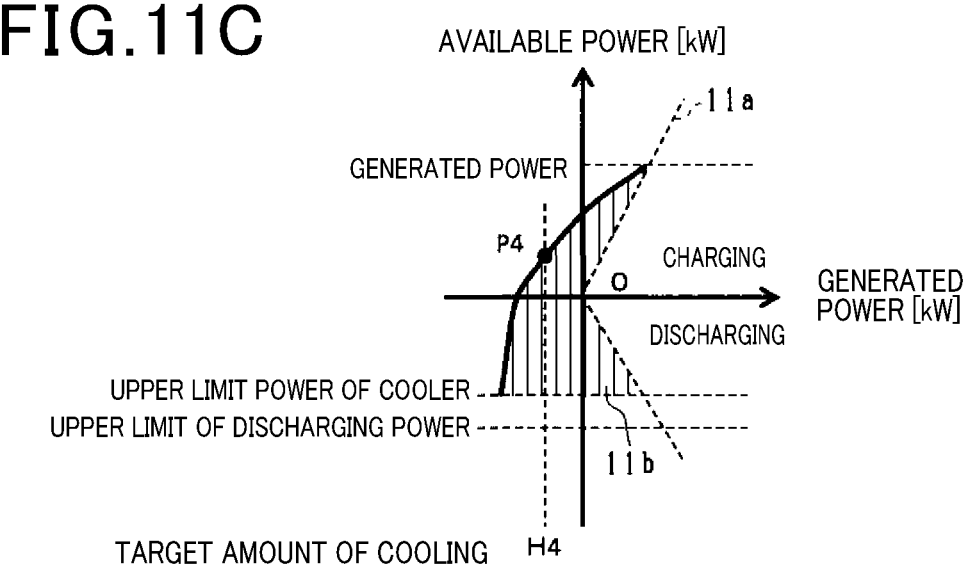

FIG. 11C illustrates a total amount of cooling of the high-voltage battery 20 and the cooler 28. In FIG. 11C, a curve represents a sum of the amount of heating indicated by FIG. 11A and the amount of cooling indicated by FIG. 11B, where the amount of heating indicated by FIG. 11A is indicated by a broken line 11a and the amount of cooling indicated by FIG. 11B is indicated by a shaded region 11b. In FIG. 11C, the upper end of power consumption of the cooler 28 (i.e., a point where power consumption=0) shown in FIG. 11B is positioned on the broken line indicating the generated power shown in FIG. 11A. Summing the amount of heating corresponding to charging/discharging power of the high-voltage battery 20 (as the solid line of FIG. 11A) and the amount of cooling corresponding to power consumption of the cooler 28 (as the curve of FIG. 11B) based on the generated power can yield an amount of heating or an amount of cooling corresponding to power available to the high-voltage battery 20 and the cooler 28 as the curve of FIG. 11C.

A target amount of cooling required to control the temperature of the high-voltage battery 20 to a target temperature can be calculated based on a current temperature of the high-voltage battery 20 and the target temperature of the high-voltage battery 20. Charging/discharging power of the high-voltage battery 20 and an amount of cooling of the cooler 28 can be derived by calculating intersections of the curve corresponding to the total amount of cooling and a vertical line corresponding to the target amount of cooling as shown in FIG. 11C.

For example, when the target amount of cooling is H4, the curve and the vertical line corresponding to the target mount of cooling H4 intersect at a single intersection P4. This intersection P4 yields charging power of the high-voltage battery 20 and power consumption of the cooler 28. A power distribution between the high-voltage battery 20 and the cooler 28 corresponding to the intersection P4 can yield the target amount of cooling H4.

FIGS. 12A-12D illustrate a timing diagram during processing shown in FIG. 10. In FIGS. 12A-12D, the horizontal axis corresponds to passage of time t. In FIG. 12A, the vertical axis corresponds to power. In FIG. 12B, the vertical axis corresponds to the temperature TB of the high-voltage battery 20. In FIG. 12C, the vertical axis corresponds to the internal cabin temperature. In FIG. 12D, the vertical axis corresponds to the power consumption of the accessories. In FIG. 12A, the broken line represents discharging/charging power of the high-voltage battery 20, and the heavy line represents the power consumption/generated power by the motor generator 22, the thin line represents the power consumption of the accessories. In FIG. 12A, the charging power and the generated power are indicated as negative power, and the discharging power and the power consumption are indicated as positive power. In FIG. 12D, the power consumption of the entirety of accessories is indicated by a heavy line, the power consumption of the compressor 25 is indicated by a thin line, the total power consumption of the compressor 25 and the converter 27 is also indicated by another thin line.

During a time period of times t10 to t13, the motor generator 22 is in regenerative operation. Generated power by the motor generator 22 is applied to power consumption of the accessory. The accessories include the cooler 28 and the compressor 25. As the temperature TB of the high-voltage battery 20 is greater than the cooling threshold T2, surplus generated power is consumed by increasing power consumption of the cooler 18. As shown in FIG. 12D, increasing the power consumption of the cooler 28 causes a decrease in the temperature TB of the high-voltage battery 20 as shown in FIG. 12B. As shown in FIG. 12C, the internal cabin temperature is above the target temperature range. Thus, as shown in FIG. 12D, power consumption of the compressor 25 is also increased. The target temperature range is a temperature range defined by a lower limit temperature below a temperature set by a driver's input and an upper-limit temperature above the set temperature. As shown in FIG. 12C, at time t10, the target temperature range is extended in a direction towards low temperatures such that a difference between the set temperature and the lower limit temperature is greater than a difference between the set temperature and the upper-limit temperature.

At time t11, in response to the temperature of the high-voltage battery 20 falling below the cooling threshold T2 as shown in FIG. 12B, the power consumption of the cooler 28 is decreased while generated power by the motor generator 22 remains unchanged. Thus, an amount of decrease in power consumption of the cooler 28 is surplus power. As shown in FIG. 12D, the power consumption of the compressor 25 is further increased to consume the amount of decrease in power consumption cooler 28. As shown in FIG. 12C, a decreasing rate of the internal cabin temperature is increased. As shown in FIG. 12A, the amount of decrease in power consumption cooler 28 and an amount of increase in power consumption of the compressor 25 cancel each other, such that power consumption of the entirety of accessories is constant during a time period of times t10 to t12.

When the internal cabin temperature falls below the lower limit temperature at time t12, the power consumption of the compressor 25 is decreased and the power consumption of the converter 27 is increased. Decreasing the power consumption of the compressor 25 can prevent the internal cabin temperature from becoming too low, falling below the lower limit temperature. At or after time t12, the power consumption of the compressor 25 is decreased to below the power consumption during a time period of times t10-t11. As shown in FIG. 12C, the internal cabin temperature gradually increases. At time t12, the internal cabin temperature is below the normal target temperature range. Thereafter, decreasing the power consumption of the compressor 25 allows the internal cabin temperature to return to within the normal target temperature range. Thus, this can provide a balance between keeping a comfortable internal cabin temperature and decreasing the charging/discharging loss. During a time period of times t12-t13, the power consumption of the converter 27 is increased and the low-voltage battery 21 is charged.

When the low-voltage battery 21 is fully charged at time t13, the power consumption of the converter 27 is decreased, which leads to a decrease in the power consumption of the entirety of accessories. Thus, surplus power of the motor generator 22 can not be entirely consumed and thus there is remaining surplus power of the motor generator 22. The remaining surplus power of the motor generator 22 is charged in the high-voltage battery 20 as shown in FIG. 12A. Since charging the high-voltage battery 20 causes heat generation of the high-voltage battery 20. the power consumption of the cooler 28 is increased to cool the high-voltage battery 20. This enables keeping the temperature TB of the high-voltage battery 20 in the order of the cooling threshold T2.

In the present embodiment, the power controller 52 is configured to, if the temperature of the high-voltage battery 20 is equal to or greater than the cooling threshold T2, increase power consumption of the cooler 28 in preference to power consumption of the accessories other than the cooler 28. This can prevent overheat of the high-voltage battery 20 and maintain a proper temperature TB of the high-voltage battery 20. The power consumption to be supplied to the cooler 28 is calculated in combination with an amount of heating caused by charging/discharging the high-voltage battery 20. If the temperature of the high-voltage battery 20 is less than the cooling threshold T2, surplus generated power by the motor generator 22 is applied to an increase in power consumption of the accessories. This can prevent generated power by the motor generator 22 from being charged in the rechargeable batteries and thereafter supplied from the rechargeable batteries to the accessories, which can reduce power loss caused by charging/discharging the rechargeable batteries.

The embodiments described above can provide the following advantages.

In the ECU 40, the selector 51 is configured to, during power generation by the motor generator 22, select the motor generator 22 in preference to the rechargeable batteries (i.e., the high-voltage battery 20 and the low-voltage battery 21), as a power source to supply power to the accessories. The power controller 52 is configured to, if generated power by the motor generator 22 exceeds power consumption of the accessories, increase the power consumption of the accessories and thereby decrease surplus generated power to be charged in the rechargeable batteries. Adjusting the power consumption of the accessories in response to the generated power by the motor generator 22 can prevent the generated power by the motor generator 22 from being charged in the rechargeable batteries and thereafter supplied from the rechargeable batteries to the accessories, which can reduce power loss caused by charging/discharging of the rechargeable batteries.

The power controller 52 may be configured to, if a SOC of a rechargeable battery, such as the high-voltage SOC or the low voltage SCO, is equal to or greater than a predetermined SOC threshold, such as the threshold X1 or X2, increase power consumption of the accessories, and if the SOC of the rechargeable battery is less than the predetermined SOC threshold, inhibit an increase of power consumption of the accessories. When the SOC of the rechargeable battery is not sufficiently high, charging the rechargeable battery with generated power by the motor generator 22 is prioritized, which enables providing a balance between properly maintaining the SOC of the rechargeable battery and reducing power loss caused by charging or discharging the rechargeable battery with generated power by the motor generator 22.

The power controller 52 may be configured to, if a temperature of the rechargeable battery is within a predetermined battery temperature range, increase power consumption of the accessories, and if the temperature of the rechargeable battery is out of the predetermined battery temperature range, inhibit an increase of power consumption of the accessories. If the temperature of the rechargeable battery is out of the predetermined battery temperature range, generated power by the motor generator 22 is ensured for controlling the temperature of the rechargeable battery. This can provide a balance between properly maintaining the SOC of the rechargeable battery and reducing power loss caused by charging or discharging the rechargeable battery with generated power by the motor generator 22.

More specifically, for example, the power controller 52 may be configured to, if a temperature of the rechargeable battery, such as the temperature TB of the high-voltage battery 20, is equal to or less than a predetermined heating threshold T1, increase power consumption of the thermoregulator 23 in preference to power consumption of the accessories other than the thermoregulator 23. If the temperature of the rechargeable battery is not sufficiently high, generated power by motor generator 22 is supplied to the thermoregulator 23 in preference to the accessories other than thermoregulator 23, thereby increasing power consumption of the thermoregulator 13. This can provide a balance between properly maintaining the temperature of the rechargeable battery and reducing power loss caused by charging or discharging the rechargeable battery with generated power by the motor generator 22. The power controller 52 may be configured to, if the high-voltage battery 20 can be charged, heat the high-voltage battery 20 by both energization of the thermoregulator 23 and charging/discharging of the high-voltage battery 20, which enables further reducing the power loss. With such a configuration of the power controller 52 that heating the rechargeable battery is prioritized, the temperature TB of the high-voltage battery 20 can be increased to a suitable temperature, which is desirable for electric vehicles having no internal-combustion engine installed.

The power controller 52 may be configured to, if a temperature of the rechargeable battery, such as the temperature TB of the high-voltage battery 20, is equal to or greater than a predetermined cooling threshold T2, increase power consumption of the cooler 28 in preference to power consumption of the accessories other than the cooler 28. If the temperature of the rechargeable battery is too high, generated power by the motor generator 22 is supplied to the cooler 28 in preference to the accessories other than the cooler 28, thereby increasing the power consumption of the cooler 28. This can provide a balance between properly maintaining the temperature of the rechargeable battery and reducing power loss caused by charging or discharging the rechargeable battery.

The power controller 52 may be configured to, if the internal cabin temperature is out of a predetermined forbidden temperature range, increase power consumption of the compressor 25 in preference to power consumption of the accessories other than the compressor 25. With this configuration, prioritizing properly maintaining the internal cabin temperature can provide a balance between ensuring driver's comfort and reducing power loss caused by charging or discharging the rechargeable battery. In addition, given that the compressor 25 is feedback controlled to keep the internal cabin temperature within the target temperature range, the power controller 52 may be configured to modify the target temperature range so as to increase power consumption of the compressor 25. Controlling the compressor 25 in such a manner enables increasing power consumption of the compressor 25 while preventing the internal cabin temperature from becoming excessively high or low.

The power controller 52 may be configured to, based on the SOC of the high-voltage battery 20, the SOC of the low-voltage battery 21, and total power consumption of the accessories, increase a running time of the converter 27 to increase the total power consumption of the accessories. This can prevent over-charge and over-discharge of each battery 20, 21 caused by too much power supply to the converter 27.

In summary, one aspect of the present disclosure provides a drive control apparatus (40, 140, 240, 340) for controlling a drive system (1, 110, 210, 310) mounted in a vehicle (11, 111, 211, 311). The drive system includes a power generator (22, 108, 208, 308), at least one rechargeable battery (20, 21, 120, 121, 220, 221, 321), a plurality of accessories (23-28, 123-128, 207, 224, 225, 227, 307, 324) powered by electrical power supplied from either or both of the least one rechargeable battery and the power generator. In the drive control apparatus, a selector (51) is configured to, during power generation by the power generator, select the power generator as a power source for the accessories in preference to the least one rechargeable battery. A power controller (52) is configured to, if generated power by the power generator exceeds power consumption of the accessories, increase the power consumption of the accessories.

In this configuration, the selector is configured to, during power generation by the motor generator, select the motor generator in preference to the rechargeable batteries (i.e., the high-voltage battery and the low-voltage battery), as a power source to supply power to the accessories. The power controller is configured to, if generated power by the motor generator exceeds power consumption of the accessories, increase the power consumption of the accessories and thereby decrease surplus generated power to be charged in the rechargeable batteries. Adjusting the power consumption of the accessories in response to the generated power by the motor generator can prevent the generated power by the motor generator from being charged in the rechargeable batteries and thereafter supplied from the rechargeable batteries to the accessories, which can reduce power loss caused by charging/discharging of the rechargeable batteries.

Modifications (M1) The present disclosure is not limited to the above specific embodiments where the ECU 40 serves as a drive control apparatus configured to control the drive system 10 as shown in FIG. 1. Techniques used in the drive control apparatus may be applicable to drive control apparatuses that control vehicle drive systems including a power generator, a rechargeable battery, accessories powered by electrical power from either or both of the rechargeable battery and the power generator. The vehicle drive systems may include systems 110, 210, 310 respectively mounted in hybrid vehicles (HV) 111, 211 as shown in FIGS. 13, 14, and a conventional gasoline-powered vehicle (conventional vehicle) as shown in FIG. 15.

Figure 13:
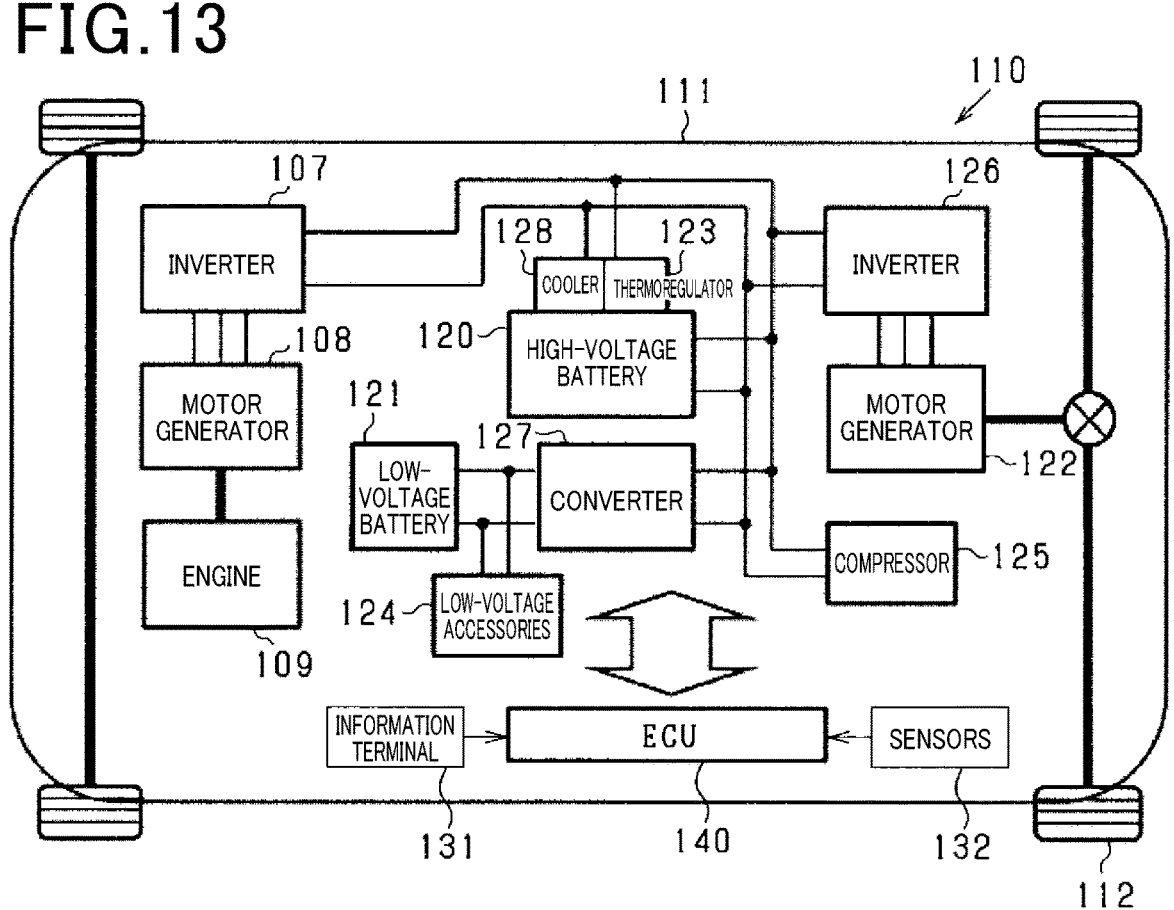
FIG. 13 is a schematic diagram of a drive system according to another embodiment.

The drive system 110 shown in FIG. 13 is mounted in the vehicle 111. The drive system 110 includes a power generator 108, an internal-combustion engine 109, a high-voltage battery 120, a low-voltage battery 121, an electric motor 122, a thermoregulator 123, low-voltage accessories 124, a compressor 125, an inverter 126, a converter 127, a cooler 128, and an ECU 140. The drive system 110 includes, as accessories, the thermoregulator 123, the low-voltage accessories 124, the compressor 125, the inverter 126, the converter 127, and the cooler 128. An information terminal 131 and sensors 132 are mounted in the vehicle 111. In the drive system 110, the power generator 108 and the electric motor 122 are separate devices. The drive system 110 is different from the drive system 10 in that the drive system 110 includes an inverter 107 for the power generator 108 and an inverter 126 for the electric motor 122. The vehicle 111 is a range extender hybrid vehicle (HV), where the electric motor 122 is actuated to drive wheels 112. The engine 109 is driven to operate the power generator 108, thereby generating comparable power to the high-voltage battery 120. Generated power by the power generator 108 is supplied to the high-voltage battery 120 and the electric motor 122 via the inverter 107. The electric motor 122 is powered by electrical power charged in the high-voltage battery 120 or power generated by the power generator 108. Since other components are similar to those of the drive system 10 shown in FIG. 1, overlapping descriptions will be omitted by offsetting the reference numerals shown in FIG. 1 by a factor of 100.

Figure 14:
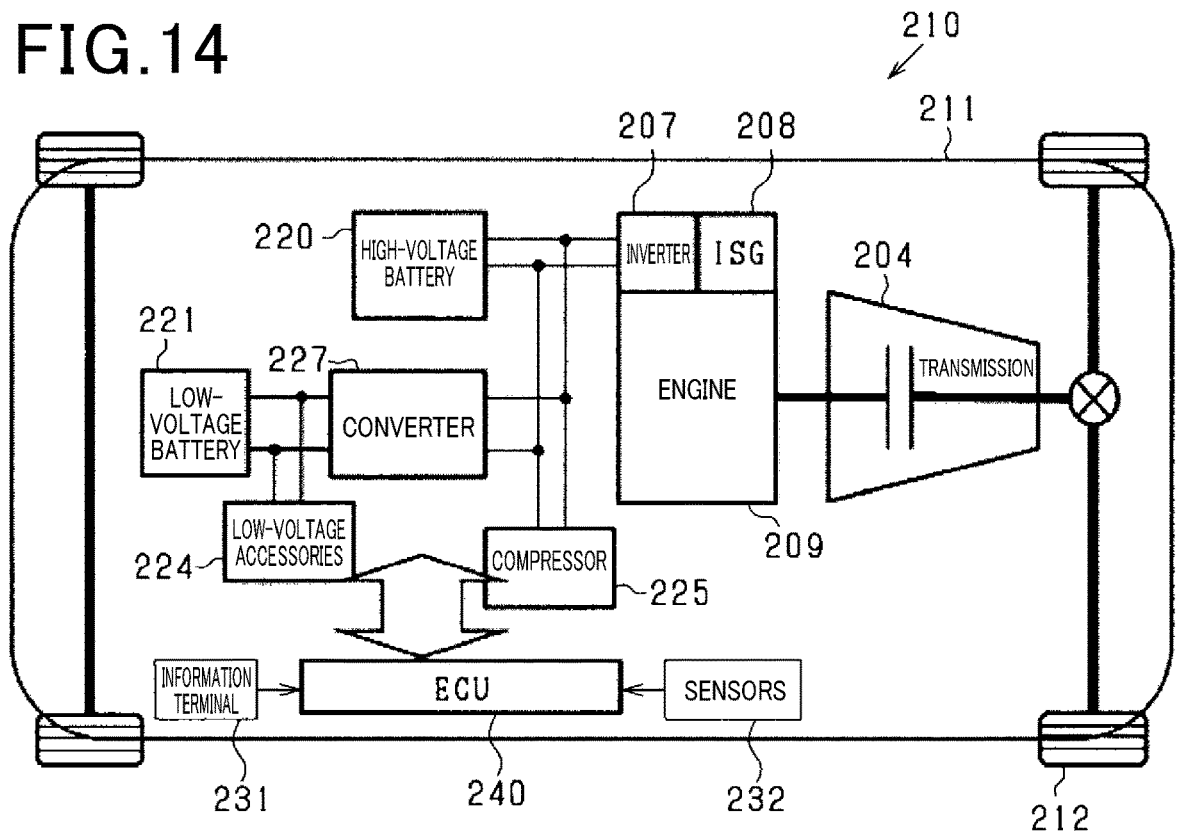
FIG. 14 is a schematic diagram of a drive system according to another embodiment.

The drive system 210 shown in FIG. 14 is mounted in the vehicle 211. The drive system 210 includes a transmission 204, an inverter 207, an integrated starter and generator (ISG) 208, an engine 209, a high-voltage battery 220, a low-voltage battery 221, and low-voltage accessories 224, a compressor 225, a converter 227, and an ECU 240. The high-voltage battery 220 is of the order of several dozen volts (e.g., 48 volts). The low-voltage battery is of the order of 10 volts (e.g., 12 volts). An information terminal 231 and sensors 232 are mounted in the vehicle 211. The drive system 210 includes, as accessories, the inverter 207, the low-voltage accessories 224, the compressor 225, and the converter 227. The vehicle 211 is a mild hybrid vehicle (HV), where wheels 212 are driven by the engine 209. The ISG 208 serves as an engine starter and power generator. Electric power regeneration during deceleration of the vehicle 211 yields a voltage of the order of several dozen volts (of the same order as the voltage of the high-voltage battery 220). Since other components are similar to those of the drive system 10 shown in FIG. 1, overlapping descriptions will be omitted by offsetting the reference numerals shown in FIG. 1 by a factor of 200.

Figure 15:
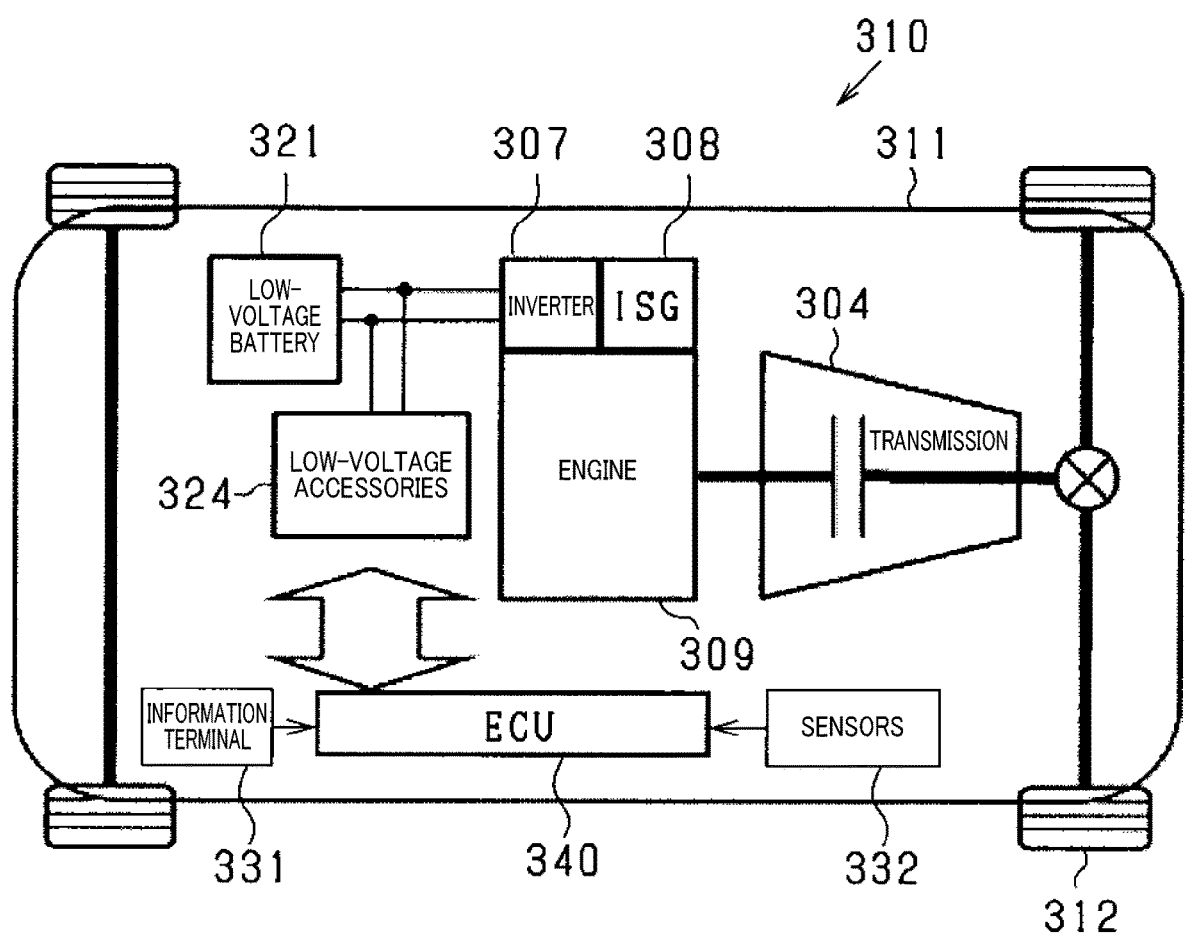
FIG. 15 is a schematic diagram of a drive system according to another embodiment.

The drive system 310 shown in FIG. 15 is mounted in the vehicle 311. The drive system 310 includes an inverter 307, an ISG 308, an engine 309, a low-voltage battery 321, low-voltage accessories 324, and an ECU 340. An information terminal 331 and sensors 332 are mounted in the vehicle 311. The drive system 310 includes, as accessories, the inverter 307 and the low-voltage accessories 324. The vehicle 311 is a conventional vehicle, where wheels 312 are driven by the engine 309. The ISG 308 serves as an engine starter and power generator. Electric power regeneration during deceleration of the vehicle 311 yields generated power of the same order as the output power of the low-voltage battery 321. Since other components are similar to those of the drive system 10 shown in FIG. 1, overlapping descriptions will be omitted by offsetting the reference numerals shown in FIG. 1 by a factor of 300.

The ECUs 140, 240, 340 of the respective drive systems 110, 210, 310 may be configured to implement various functions similar to those performed by the ECU 40 of the drive system 10. Particularly, the ECUs 140, 240, 340 may be configured to determine a distribution of generated power by the power generator 108 and the ISGs 208, 308 in similar manners to those of the first to fourth embodiments.

What is claimed is:

1. A drive control apparatus configured to control a drive system mounted in a vehicle, the drive system including a power generator, at least one rechargeable battery, and a plurality of accessories powered by electrical power supplied from either or both of the least one rechargeable battery and the power generator, the apparatus comprising:
    a selector configured to select the power generator as a power source for the plurality of accessories in preference to the at least one rechargeable battery whenever the power generator is generating power; and
    a power controller configured to, if generated power by the power generator exceeds power consumption of the plurality of accessories, increase the power consumption of the plurality of accessories.

2. The apparatus according to claim 1, wherein
the power controller is configured to, if a state of charge (SOC) of the at least one rechargeable battery is equal to or greater than a predetermined SOC threshold, increase the power consumption of the plurality of accessories.

3. The apparatus according to claim 1, wherein
the power controller is configured to, if a temperature of the at least one rechargeable battery is within a predetermined battery temperature range, increase the power consumption of the plurality of accessories.

4. The apparatus according to claim 1, wherein
the plurality of accessories includes a thermoregulator configured to heat the at least one rechargeable battery, and
the power controller is configured to, if a temperature of the at least one rechargeable battery is equal to or less than a predetermined heating threshold, increase the power consumption of the thermoregulator in preference to the accessories of the plurality of accessories other than the thermoregulator.

5. The apparatus according to claim 1, wherein
the plurality of accessories includes a cooler configured to cool the least one rechargeable battery, and
the power controller is configured to, if a temperature of the at least one rechargeable battery is equal to or greater than a predetermined cooling threshold, increase the power consumption of the cooler in preference to the accessories of the plurality of accessories other than the cooler.

6. The apparatus according to claim 1, wherein
the plurality of accessories includes a compressor used for air conditioning in a cabin of the vehicle, and
the power controller is configured to, if an internal cabin temperature is out of a predetermined forbidden temperature range, increase the power consumption of the compressor in preference to power consumption of the accessories of the plurality of accessories other than the compressor.

7. The apparatus according to claim 6, wherein
the compressor is feedback controlled such that the internal cabin temperature is within a predetermined target temperature range, and
the power controller is configured to, if the internal cabin temperature is out of the predetermined forbidden temperature range, modify the target temperature range to increase the power consumption of the compressor.

8. The apparatus according to claim 1, wherein
the at least one rechargeable battery includes a high-voltage rechargeable battery whose output voltage is high and a low-voltage rechargeable battery whose output voltage is lower than the output voltage of the high-voltage rechargeable battery,
the plurality of accessories includes a DC-to-DC converter configured to convey power between the high-voltage rechargeable battery and the low-voltage rechargeable battery, and
the power controller is configured to, based on a SOC of the high-voltage rechargeable battery, a SOC of the low-voltage rechargeable battery, and total power consumption of the plurality of accessories, increase power consumption of the DC-to-DC converter.

9. The apparatus according to claim 1, wherein
the power generator is an electric motor, and
the vehicle does not include an internal combustion engine.

\* \* \* \* \*